(12) United States Patent
Azuma et al.

(10) Patent No.: US 7,825,968 B2
(45) Date of Patent: Nov. 2, 2010

(54) MULTI-COLOR IMAGE PROCESSING APPARATUS AND SIGNAL PROCESSING APPARATUS

(75) Inventors: Takeo Azuma, Kyoto (JP); Kunio Nobori, Osaka (JP); Taro Imagawa, Osaka (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/517,391

(22) PCT Filed: Aug. 29, 2008

(86) PCT No.: PCT/JP2008/002372

§ 371 (c)(1),
(2), (4) Date: Jun. 3, 2009

(87) PCT Pub. No.: WO2009/031287

PCT Pub. Date: Mar. 12, 2009

(65) Prior Publication Data

US 2010/0013948 A1     Jan. 21, 2010

(30) Foreign Application Priority Data

Sep. 7, 2007     (JP) .............................. 2007-233258

(51) Int. Cl.
*H04N 5/225*     (2006.01)
*H04N 5/228*     (2006.01)

(52) U.S. Cl. .................................. 348/262; 348/208.6

(58) Field of Classification Search ........................ None
See application file for complete search history.

(56) References Cited

U.S. PATENT DOCUMENTS 6,690,422 B1 * 2/2004 Daly et al. .................. 348/273

(Continued)

FOREIGN PATENT DOCUMENTS

JP     06-315154     11/1994

(Continued)

OTHER PUBLICATIONS

International Search Report for corresponding application No. PCT/JP2008/002372 completed Nov. 28, 2008.

(Continued)

*Primary Examiner*—Justin P Misleh
(74) *Attorney, Agent, or Firm*—Renner, Otto, Boissell & Sklar, LLP

(57) ABSTRACT

A multi-color image processor according to the present invention includes an image capturing section 101 and a signal processing section 104. The image capturing section 101 includes a color separating section 10 for separating visible radiation into at least two light rays with first- and second-color components, respectively, and first and second imagers 12 and 14 that receive the light rays with the first- and second-color components. The image capturing section 101 gets images with the first- and second-color components by making the first imager 12 decimate pixels to read, but making the second imager 14 read every pixel, on a field-by-field basis on respective arrangements of pixels of the first and second imagers 12 and 14. The signal processing section 104 includes: a motion estimating section 107 for estimating, based on the images with the second-color components, a motion in a moving picture made up of images with the second-color components and outputting motion information; an image generating section 108 for generating a synthetic image of the first-color components of respective fields based on the images with the first-color components and the motion information and outputting it as a first synthetic image with a higher spatial resolution than the images with the first-color components; and a multi-color image synthesizing section 109 for generating and outputting a multi-color moving picture with the first- and second-color components based on the first synthetic image and the images with the second-color components.

17 Claims, 29 Drawing Sheets

U.S. PATENT DOCUMENTS

| | | |
|---|---|---|
| 7,567,271 B2 * | 7/2009 | Berestov .................. 348/48 |
| 2003/0151685 A1 * | 8/2003 | Ia Grone ................. 348/262 |
| 2004/0095489 A1 * | 5/2004 | Hirose .................... 348/262 |
| 2007/0189386 A1 | 8/2007 | Imagawa et al. |

FOREIGN PATENT DOCUMENTS

| | | |
|---|---|---|
| JP | 2004-040422 | 2/2004 |
| JP | 2007/028208 | 2/2007 |
| JP | 3934151 | 3/2007 |

OTHER PUBLICATIONS

Co-pending U.S. Appl. No. 12/517,852, filed Jun. 5, 2009; application provided.

Co-pending U.S. Appl. No. 12/517,856, filed Jun. 5, 2009; application provided.

* cited by examiner

WHAT IS 1 TO n INTERLACING (WHERE n=8)

PIXELS ACTUALLY READ
WHERE n=4
LINES 2→4→1→3

PIXELS ACTUALLY READ
WHERE n=5
LINES 2→5→3→1→4

PIXELS ACTUALLY READ
WHERE n=6
LINES 1→4→6→2→5→3

PIXELS ACTUALLY READ
WHERE n=7
LINES 3→6→1→4→7→2→5

PIXELS ACTUALLY READ
WHERE n=8
LINES 3→6→2→8→5→1→7→4

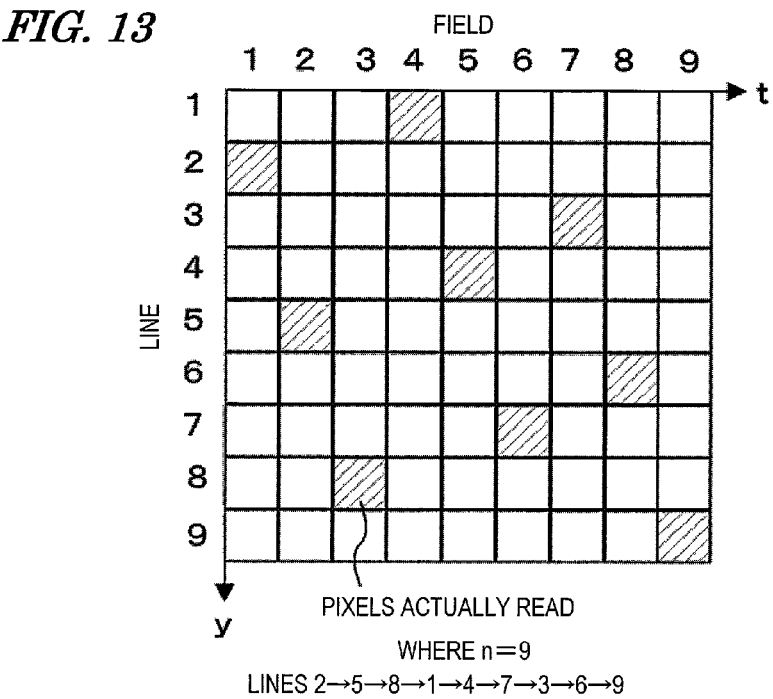
FIG. 13
PIXELS ACTUALLY READ
WHERE n=9
LINES 2→5→8→1→4→7→3→6→9
FIG. 14
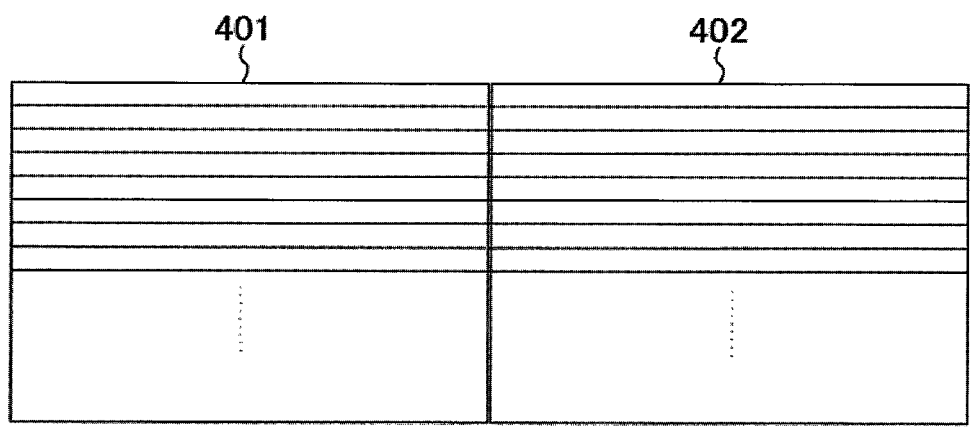

(a) 1ST FIELD (b) 2ND FIELD (c) 3RD FIELD

MULTI-COLOR IMAGE PROCESSING APPARATUS AND SIGNAL PROCESSING APPARATUS

TECHNICAL FIELD

The present invention relates to an image processing technique for generating a color moving picture with the resolution and frame rate both increased.

BACKGROUND ART

In the field of technology of image capture devices, the image qualities achieved by digital camcorders and digital still cameras have been significantly improved, and the number of functions provided for a single image capture device has been rapidly increased, these days. A list of main indices indicating the image quality of a moving picture generated by any of these image capture devices includes the number of pixels per frame (i.e., the resolution), the number of frames per second (i.e., the frame rate), and the ratio of an image signal to noise (SNR). There are various levels of resolutions available from the number of pixels that is barely usable for a QCIF compliant TV phone to as high a resolution as more than 10 million pixels for a digital single-lens reflex camera. Likewise, there are a wide variety of frame rates from only several frames per second to perform the sequential shooting function of a digital still camera to at least 30 frames per second for camcorders (and even more than 1,000 frames per second for special-purpose high shutter speed cameras).

However, it is difficult to further increase the image data read rate for imagers (such as CCDs and CMOS image sensors) that are used extensively now in those image capture devices. That is to say, there is a certain upper limit to the image data read rate. That is why it is not easy to capture a moving picture with both the resolution and frame rate kept high.

A conventional device for capturing a moving picture with a high resolution and a high frame rate synthesizes together multiple fields of an image that have been read with the reading start points changed one field after another (which will be referred to herein as a "1 to n interlaced image" 171) into a single frame of image (which will be referred to herein as a "full-frame image" 172) as shown in FIG. 37. Patent Document No. 1 discloses a device for generating a high-resolution frame image based on the pictures that have been read by such a method by reference to the information about a motion between the fields.

The Nyquist rate of an image is determined by the spatial sampling rate, or the number of pixels, of an image. According to the three-line decimation technique shown in FIG. 37, a single frame image is formed of three fields. In that case, the number of lines per field becomes one third as large as that of each frame image. That is why the sampling rate of each field image perpendicular to the direction in which the lines run becomes one third as high as the sampling rate of the frame image in the same direction. The Nyquist rate is a half of the sampling rate. That is why the Nyquist rate of each field image perpendicular to the direction in which the lines run also becomes one third as high as the Nyquist rate of the frame image in the same direction.

If a frame image included high-frequency components, of which the frequencies are equal to or higher than the Nyquist rate of each field image, then the field image would have aliasing components. Such aliasing components are generally superposed as either disturbance or noise on the frequency components, of which the frequencies are equal to or lower than the Nyquist rate. However, it is known that if multiple images with such aliasing components and their relative positions corresponding to the shift between the images are known, then a resolution that is equal to or higher than that of each of such images can be restored by a so-called "super-resolution" technology. For example, if an object and a camera are standing still relative to each other, a frame image can be restored based on multiple field images. In that case, since the Nyquist rate of each field image is equal to or lower than that of a frame image, signal components, of which the frequencies are equal to or higher than the Nyquist rate of each field image, will be included in the field image as the aliasing components. For that reason, in the frame image restored, those aliasing components can be restored as high-frequency components, of which the frequencies are equal to or higher than the Nyquist rate of the field image.

Even in a situation where the relative positions of an object and a camera change with time, as long as the motion of the object as viewed from the camera can be tracked accurately, an image with high-frequency components can also be restored by taking that motion into account as well as in the situation where they are standing still.

Patent Document No. 1: Japanese Patent Application Laid-Open Publication No. 2007-028208

DISCLOSURE OF INVENTION

Problems to be Solved by the Invention

According to the conventional technique for increasing the resolution of an image that has been read with the reading start points changed on a field-by-field basis, such a high-resolution picture can be restored only if each field has aliasing components and if the motion between those fields can be estimated accurately. If each field has aliasing components, however, it is difficult to estimate the motion between the fields accurately enough because those aliasing components cause disturbance in a non-aliasing signal.

The aliasing components are determined by the sampling points and the temporal and spatial frequencies and the phase of the original signal. That is why the aliasing components of two fields are generally different from each other. As a result, during a motion estimation process, the aliasing components become noise that will decrease the accuracy of motion estimation. For that reason, according to the method disclosed in Patent Document No. 1, the greater the interlacing number n, the more and more difficult it is to estimate the motion between the fields.

In order to overcome the problems described above, the present invention has an object of providing a multi-color image processor and processing method that can estimate the motion between fields accurately enough even if the interlacing number n increases.

Another object of the present invention is to provide an image capture device, a signal processor and a computer program that will contribute to overcoming those problems.

Means for Solving the Problems

A multi-color image processor according to the present invention includes an image capturing section including a color separating section for separating visible radiation into a light ray with a first-color component and a light ray with a second-color component, which is different from the first-color component, and first and second imagers that receive the light ray with the first-color component and the light ray with the second-color component, respectively. The image capturing section gets multiple images with the first-color components by making the first imager decimate pixels to read on a field-by-field basis on an arrangement of pixels of the first imager and also gets multiple images with the second-color components using the second imager on a field-by-field basis on an arrangement of pixels of the second imager. The processor further includes: a motion estimating section for estimating, based on the images with the second-color components, a motion in a moving picture made up of those images with the second-color components and outputting motion information; an image generating section for generating a synthetic image of the first-color components of respective fields based on the images with the first-color components and the motion information and outputting the image thus generated as a first synthetic image that has a higher spatial resolution than the images with the first-color components; and a multi-color image synthesizing section for generating and outputting a multi-color moving picture with the first- and second-color components based on the first synthetic image and the images with the second-color components.

In one preferred embodiment, the image capturing section gets the images with the first-color components, of which one frame is comprised of n fields (where n is an integer that is equal to or greater than two), by changing the positions of pixels to read on the first imager one field after another.

In this particular preferred embodiment, in accordance with the motion information, the image generating section defines the spatial resolution of the first synthetic image to be n times as high as that of the images with the first-color components.

In a specific preferred embodiment, the spatial resolution of the first synthetic image is higher than that of the images with the second-color components.

In a more specific preferred embodiment, the image capturing section gets each said image with the second-color component by using at least one pixel, of which the size is bigger than each pixel of the first imager, as a minimum unit of pixels to read on the arrangement of pixels of the second imager.

In another preferred embodiment, the multi-color image processor includes a resolution increasing section for generating and outputting a second synthetic image based on the first synthetic image and the second images by increasing the resolution of the second images by reference to information about the first synthetic image. The multi-color image synthesizing section generates and outputs a multi-color moving picture, including the first- and second-color components, based on the first and second synthetic images.

In this particular preferred embodiment, the spatial resolution of the second synthetic image is as high as that of the first synthetic image.

In another preferred embodiment, the pixels to read selected by the image capturing section on a field-by-field basis on the arrangement of pixels of the first imager have a first pattern in which multiple pixels, selected from the arrangement of pixels, are arranged in line.

In an alternative preferred embodiment, the pixels to read selected by the image capturing section on a field-by-field basis on the arrangement of pixels of the first imager have a second pattern in which multiple pixels, selected from the arrangement of pixels, are distributed discretely.

In still another preferred embodiment, the pixels to read selected by the image capturing section on a field-by-field basis on the arrangement of pixels of the first imager have their arrangement patterns changed between a first pattern in which multiple pixels, selected from the arrangement of pixels, are arranged in line and a second pattern in which multiple pixels, selected from the arrangement of pixels, are distributed discretely.

In yet another preferred embodiment, the color separating section is designed to separate the visible radiation into not only the respective light rays with the first- and second-color components but also a light ray with a third-color component that is different from the first- and second-color components. The image capturing section further includes a third imager that receives the light ray with the third-color component and gets multiple images with the third-color components on a field-by-field basis on the arrangement of pixels of the third imager. The motion estimating section estimates, based on the second and third images, a motion in a moving picture made up of the second and third images and outputs the motion information. The multi-color image synthesizing section generates and outputs a multi-color moving picture with the first-, second- and third-color components based on not only the first synthetic image and the images with the second-color components but also the images with the third-color components.

In yet another preferred embodiment, the images with the second-color components have a different spatial arrangement of pixels from the images with the third-color components.

In a specific preferred embodiment, the first-color component is green.

In yet another preferred embodiment, the image capturing section includes a spatial light modulator that is arranged in front of the first imager. The spatial light modulator has multiple pixels, which face the respective pixels of the first imager and which selectively transmit or cut off incoming light, thereby making the incoming light incident on selected ones of the pixels of the first imager.

An image capture device according to the present invention includes: a color separating section for separating visible radiation into a light ray with a first-color component and a light ray with a second-color component, which is different from the first-color component, and first and second imagers that receive the light ray with the first-color component and the light ray with the second-color component, respectively. The image capture device gets multiple images with the first-color components by making the first imager decimate pixels to read on a field-by-field basis on an arrangement of pixels of the first imager and also gets multiple images with the second-color components using the second imager on a field-by-field basis on an arrangement of pixels of the second imager.

In one preferred embodiment, the image capture device further includes a storage section that stores the images with first-color components and the images with the second-color components.

A signal processor according to the present invention outputs a multi-color moving picture based on multiple images with first-color components, of which one frame is comprised of n fields (where n is an integer that is equal to or greater than two), and multiple images, which have second-color components different from the first-color components and of which one frame consists of one field. The processor includes: a motion estimating section for outputting, based on the images with the second-color components, motion information about a moving picture made up of those images with the second-color components; an image generating section for generating a synthetic image of the first-color components of respective fields based on the images with the first-color components and the motion information and outputting the image thus generated as a first synthetic image that has a higher spatial resolution than the images with the first-color components; and a multi-color image synthesizing section for generating and outputting a multi-color moving picture with the first- and second-color components based on the first synthetic image and the images with the second-color components.

A multi-color image processing method according to the present invention is a method for outputting a multi-color moving picture based on multiple images with first-color components, of which one frame is comprised of n fields (where n is an integer that is equal to or greater than two), and multiple images, which have second-color components different from the first-color components and of which one frame consists of one field. The method includes the steps of: obtaining images with the first-color components; obtaining images with the second-color components; estimating, based on the images with the second-color components, a motion in a moving picture made up of those images with the second-color components and outputting motion information; getting a motion compensation done by outputting a synthetic image of the first-color components based on the images with the first-color components and the motion information at a higher frame rate than a frame rate at which the images with the first-color components are obtained; and generating and outputting a multi-color moving picture with the first- and second-color components based on the synthetic image of the first-color components and the images with the second-color components.

A program according to the present invention is defined to operate a signal processor that outputs a multi-color moving picture based on multiple images with first-color components, of which one frame is comprised of n fields (where n is an integer that is equal to or greater than two), and multiple images, which have second-color components and of which one frame consists of one field. The program is defined to make the signal processor perform the steps of: outputting, based on the images with the second-color components, motion information about a moving picture made up of those images with the second-color components; generating a synthetic image of the first-color components of respective fields based on the images with the first-color components and the motion information and outputting the image thus generated as a first synthetic image that has a higher spatial resolution than the images with the first-color components; and generating and outputting a multi-color moving picture with the first- and second-color components based on the first synthetic image and the images with the second-color components.

EFFECTS OF THE INVENTION

According to the present invention, even if a moving picture with first-color components (that are normally G components) has a lot of aliasing components, motion compensation is done using a moving picture with no aliasing components. As a result, the resolution of the moving picture with the first-color components can be increased and a multi-color moving picture of high image quality can be obtained eventually.

BRIEF DESCRIPTION OF DRAWINGS

FIG. 13 shows an exemplary order of reading lines in a situation where n=9.

FIG. 14 shows the concept of a configuration that uses a reading system of two channels.

Figure 1:
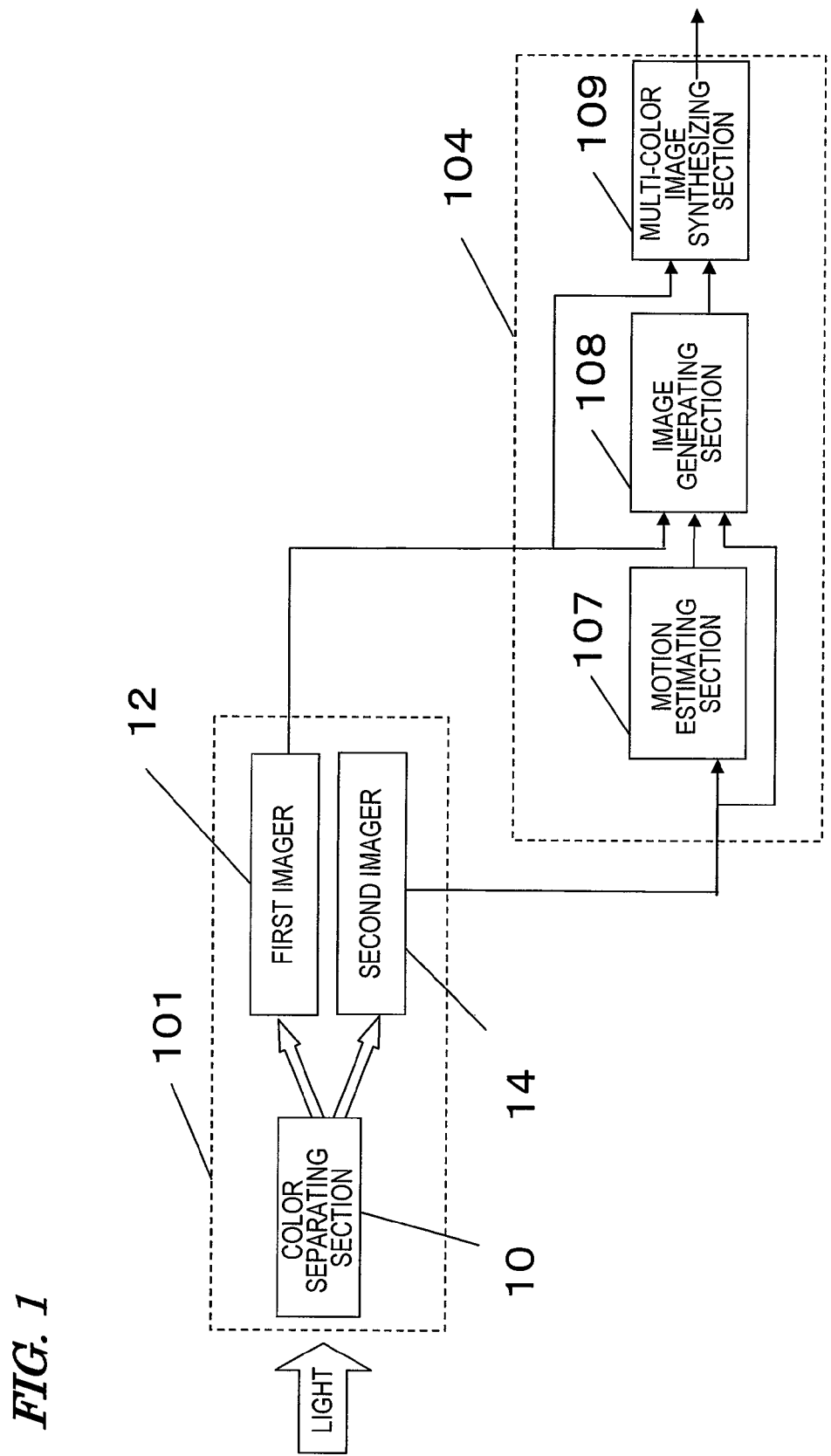
FIG. 1 is a block diagram illustrating a configuration for a multi-color image processor according to the present invention.

DESCRIPTION OF REFERENCE NUMERALS 101 image capturing section
102 writing control section
103 memory
104 signal processing section
105 setting section
106 storage section
401 original image
402 output image

BEST MODE FOR CARRYING OUT THE INVENTION

As shown in FIG. 1, a multi-color image processor according to the present invention includes an image capturing section 101, which includes a color separating section 10 that separates incoming visible radiation into multiple light rays and first and second imagers 12 and 14 that receives those separated light rays. More specifically, the color separating section 10 separates the incoming visible radiation into at least a light ray with a first-color component and a light ray with a second-color component, which is different from the first-color component. The image capturing section 101 gets multiple images with the first-color components by decimating pixels to read on a field-by-field basis on an arrangement of pixels of the first imager 12. As for the images with the second-color components, on the other hand, the image capturing section 101 can get the images with the second-color components on a field-by-field basis on an arrangement of pixels of the second imager 14 without decimating them. In this manner, a "moving picture" is formed by those multiple images that have been obtained one field after another. As used herein, a group of multiple images that are obtained on a field-by-field basis will be simply referred to herein as a "moving picture".

Figure 2:
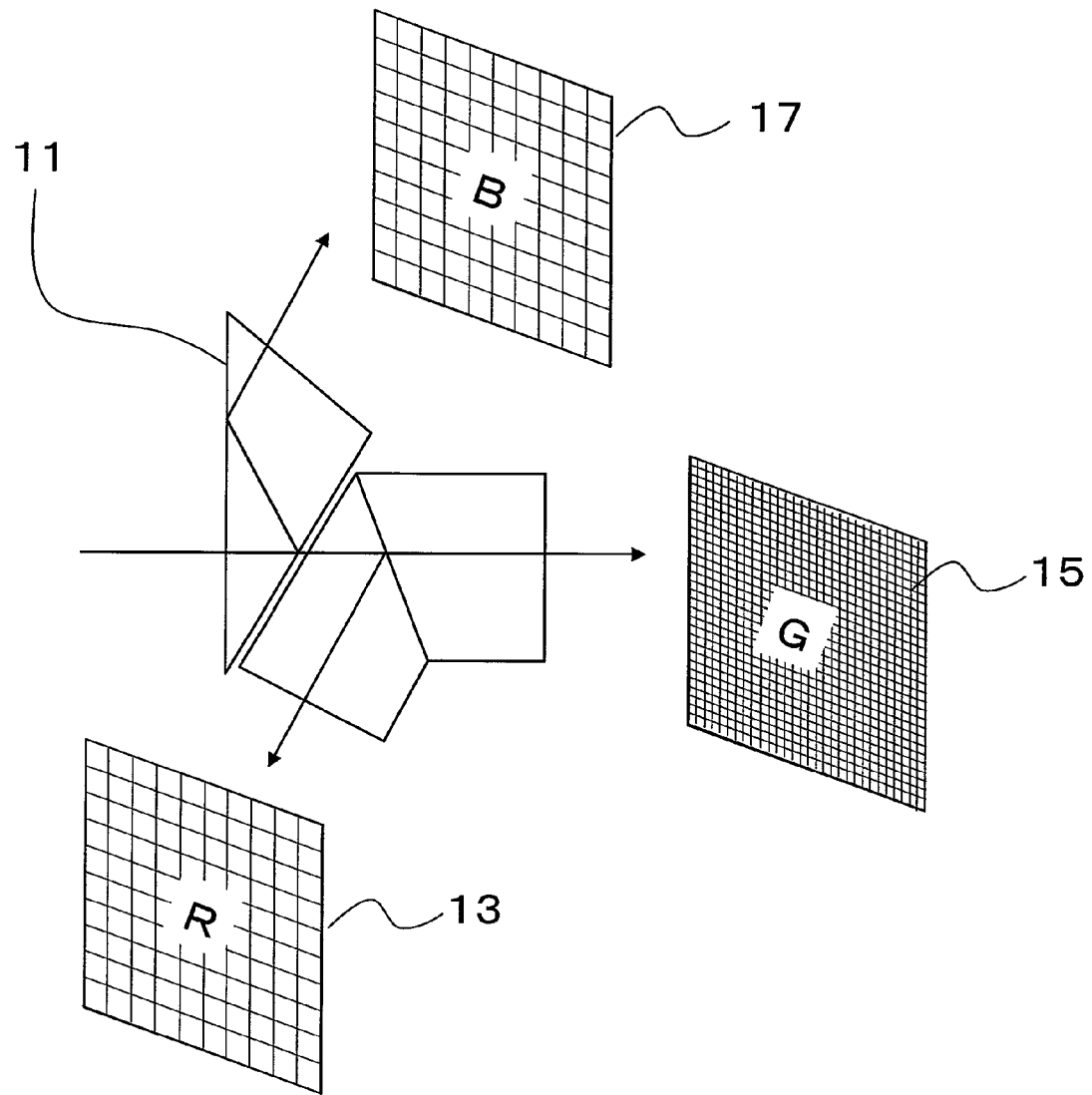
FIG. 2 shows how a dichroic prism separates light into R, G and B components.

In a preferred embodiment, the image capturing section 101 can separate the incoming visible radiation into a first-color component (which may be green (G)), a second-color component (which may be red (R)) and a third-color component (which may be blue (B)). FIG. 2 illustrates an exemplary configuration for such an image capturing section 101. The image capturing section shown in FIG. 2 includes a dichroic mirror 11 that selectively transmits or reflects the incoming light according to the wavelength thereof, i.e., depending on which of the three wavelength ranges of R, G and B the incoming light falls in. As a result, light rays falling within those three wavelength ranges can be imaged on imagers 13, 15, and 17 for R, G and B, respectively. In this example, the dichroic mirror 11 functions as the color separating section 10 shown in FIG. 1. Also, the G imager 15 serves as the first imager 12 and the R imager 13 serves as the second imager 14. And the B imager 17 will serve as a third imager (not shown in FIG. 1). Optionally, the color processed by the second imager 12 does not have to be R but may also be B as well.

In this manner, the image capturing section of the present invention typically obtains a moving picture consisting of color components of three colors. However, the number of color components may be two or even four or more. That is to say, the "multi-color" of this multi-color image processor just refers to "multiple colors" and it does not matter whether the number of those colors is small or large.

In the example illustrated in FIG. 2, the pixel size of the R and B imagers is defined to be bigger than that of the G imager and the spatial resolution of R and B is defined to be lower than that of G. That is to say, on the arrangements of pixels of the R and B imagers 13 and 17, R and B images are obtained by using a pixel, of which the size is bigger than each pixel of the G imager 15, as a minimum unit of pixels to read. Meanwhile, in a situation where the R and B imagers have the same pixel size as the G imager, the image may be obtained by using a number of pixels as a minimum unit of pixels to read for R and B. Then, virtually the same effect can be achieved as the situation where their pixel size is increased.

As the color component that should rather have a relatively high spatial resolution, G is preferred to R or G. This is because a person's visual sensitivity to the color G is higher than his or her visual sensitivity to any of the other two colors (i.e., because the human vision is most sensitive to the spatial resolution of G). Nevertheless, according to the present invention, the first-color component does not have to be G but any of the other two colors may be selected as the first-color component, too.

Figure 3:
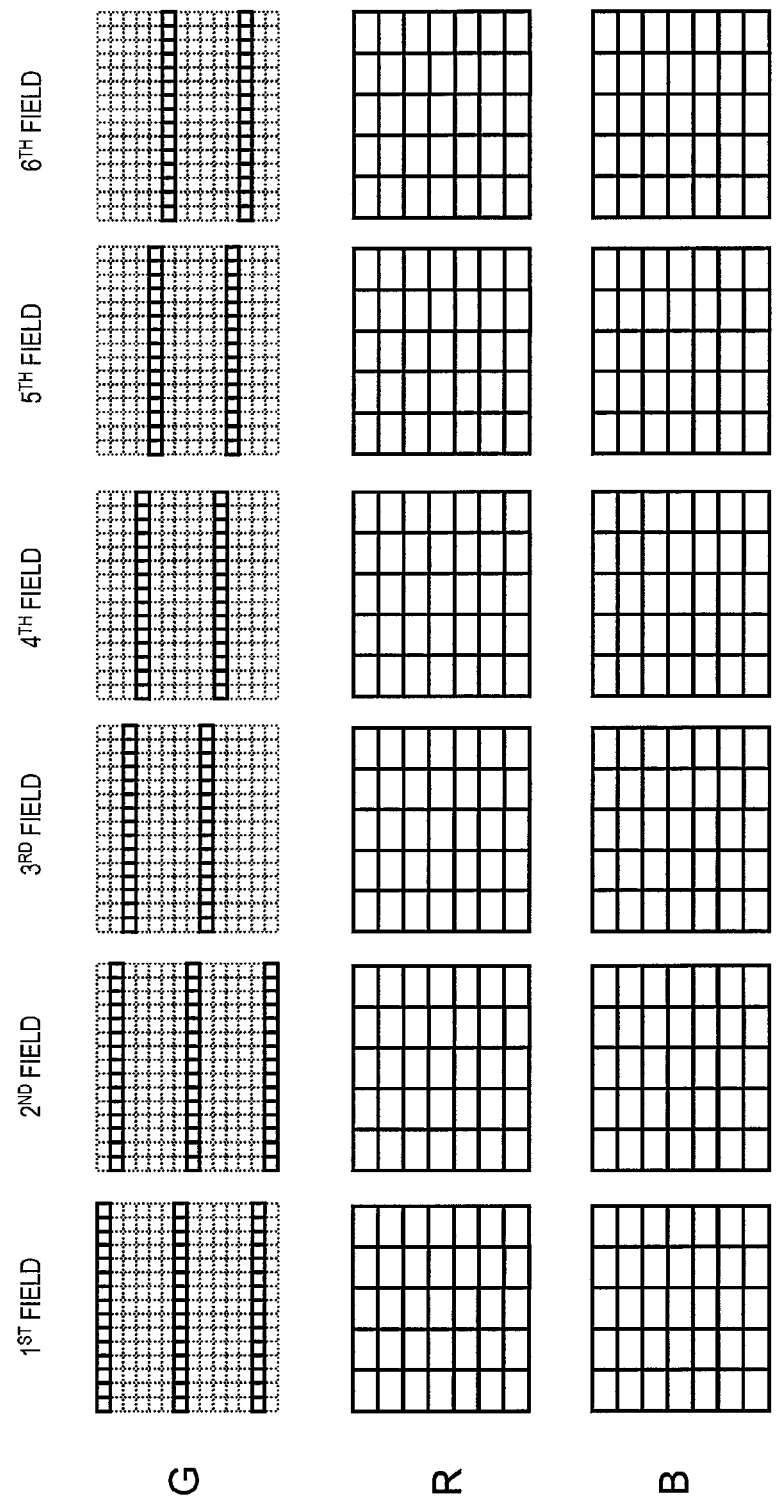
FIG. 3 schematically illustrates how an image capturing section 101 performs an image capturing operation in a first preferred embodiment of the present invention.

In a preferred embodiment of the present invention, the positions of pixels to read on the G imager are changed on a field-by-field basis (i.e., some pixels are decimated) so that one frame of the moving picture of G consists of n fields (where n is an integer that is equal to or greater than two). On the other hand, as for moving pictures of R and G, one frame thereof consists of one field. FIG. 3 is a plan view schematically illustrating how to make one frame on the G, R, and B imagers, and shows only a part of the arrangement of pixels on the image capturing plane of each imager. In the example illustrated in FIG. 3, the G moving picture is captured by reading only a part of the pixels arranged on the G imager with multiple lines of pixels decimated (which is termed "multi-interlaced reading"). In the G pixel arrangement shown in FIG. 3, the pixels surrounded with each bold rectangle are pixels to read. As can be seen from FIG. 3, the lines of pixels to read shift one field after another. Meanwhile, the R and B moving pictures are captured without decimating any line of pixels arranged on the R or B imager. That is to say, in any field, each and every pixel of the pixel arrangement is read and no pixels to read are decimated at all.

According to the present invention, a motion in the moving picture is estimated based on the R and B moving pictures thus obtained, thereby getting "motion information". Since the motion is estimated based on the moving pictures that have been obtained without decimating any pixels at all, highly accurate motion information can be obtained with the problems with the prior art avoided.

Figure 4:
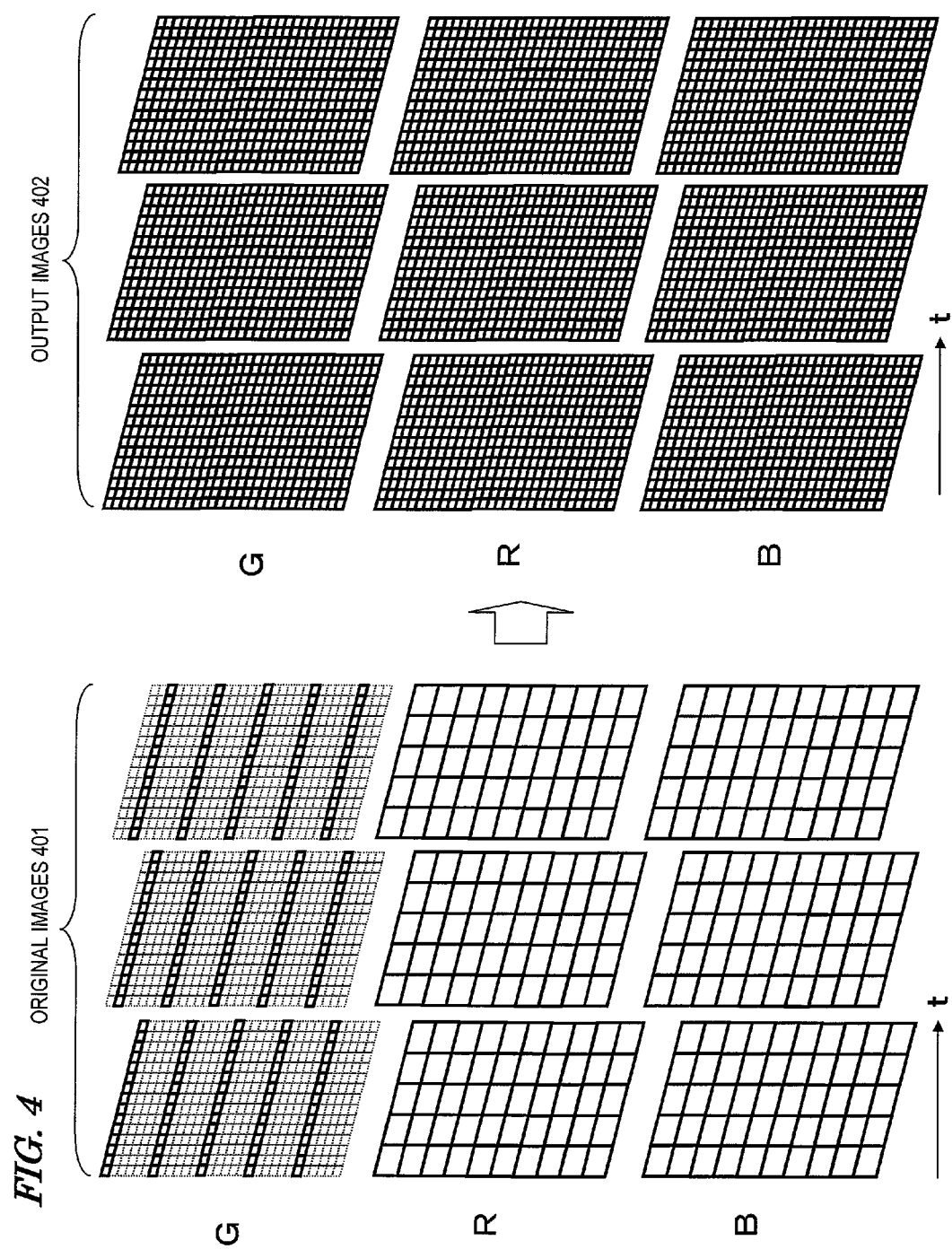
FIG. 4 schematically illustrates how the multi-color image processor of the first preferred embodiment of the present invention operates.

Also, according to the present invention, by using that motion information, a synthetic image of G is generated by increasing the spatial resolution of the G moving picture. FIG. 4 schematically illustrates the spatial resolutions of G, R and B images that form original images 401 and output images 402. FIG. 4 illustrates pixels that are read actually and pixels that are output actually for three fields of G, R and B and indicates pixels that are not read actually by the dotted lines. In FIG. 4, the spatial resolution of the non-decimated R and B image is also increased. But the spatial resolution of R and B images is increased using the synthetic image of G that has had its resolution increased.

Such an increase in spatial resolution is realized by the signal processing section 104 shown in FIG. 1. As will be described in detail later, the signal processing section 104 includes: a motion estimating section 107 for estimating a motion in a moving picture made up of images with the second-color components, thereby outputting motion information; an image generating section 108 for generating a synthetic image of the first-color components based on the motion information; and a multi-color image synthesizing section 109 for generating and outputting a multi-color moving picture that has had its resolution increased compared to the original image.

Embodiment 1

Hereinafter, a first specific preferred embodiment of a multi-color image processor according to the present invention will be described with reference to FIG. 5.

The multi-color image processor of this preferred embodiment includes an image capturing section 101 for separating incoming visible radiation into R, G and B rays to obtain the moving pictures (i.e., the original images 401 shown in FIG. 4) described above, a storage section 106 for storing the original images, and a signal processing section 104 for performing processing of increasing the temporal and spatial resolutions using the original images that are stored in the storage section 106.

The storage section 106 includes a memory 103 that stores the original images and a writing control section 102 that writes the original images on the memory 103. As the memory 103, any suitable storage device that can store image data may be used. However, the memory 103 does not have to be built in this processor but may also be a removable storage medium.

The signal processing section 104 includes a motion estimating section 107, an image generating section 108 and a multi-color image synthesizing section 109. In the exemplary configuration shown in FIG. 5, the processor further includes a setting section 105 for setting conditions on the image capturing operation to be done by the image capturing section 101 and on the signal processing to be done by the signal processing section 104. However, if there is no need to change the settings of the image capturing section 101 and the signal processing section 104, then the setting section 105 does not have to be provided. The setting section 105 has the functions of setting the n value of 1 to n interlacing, the size of a high-resolution picture generated by the signal processing section 104, the frame rate, and so on.

In this preferred embodiment, the image capturing section 101 preferably has the configuration shown in FIG. 2 and generates original images as the field images shown in FIG. 3, for example. In this example, the image capturing section 101 gets 1 to 6 interlaced images as the original images as for G but gets non-interlaced images as the original images as for R and B. That is to say, as for G, only pixels on every sixth row as counted vertically are read, among a number of rows of pixels that are arranged horizontally, with the other pixels decimated. As for R and B, on the other hand, every pixel is read using imagers that have a lower resolution and a bigger pixel size than G. The decimation ratio is defined to be 1 to 6 in this example. However, as long as 1 to n (where n is an integer that is equal to or greater than two) is satisfied, n does not have to be six but may also be around 10 or equal to or smaller than 10.

In this preferred embodiment, the image capturing section 101 gets the 1 to n interlaced moving picture for G and low-resolution moving pictures for R and B, thereby obtaining the original images 401 shown in FIG. 4. The signal processing section 104 can output moving pictures, each of which is not a field image but a frame image (and which will be referred to herein as "full-frame moving pictures"), as the output images 402 shown in FIG. 4.

Figure 6:
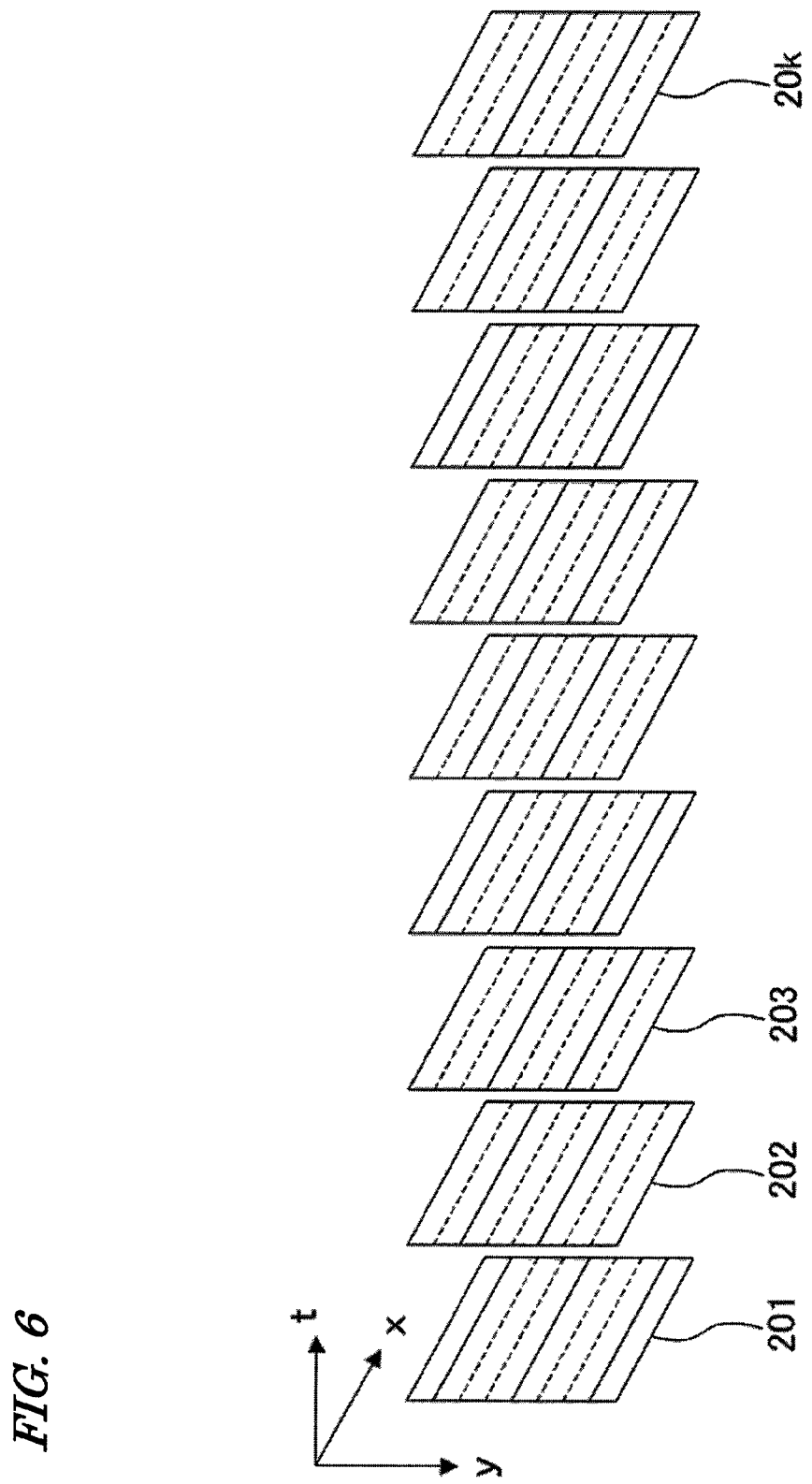
FIG. 6 shows the concept of how to perform multi-interlaced reading.

FIG. 6 illustrates how to perform the multi-interlaced read operation when n=3 (i.e., 1 to 3 interlaced read operation). In the xyz coordinate system shown in FIG. 6, the x-axis indicates the horizontal axis of the image capturing plane, the y-axis indicates the vertical axis of the image capturing plane, and the t-axis indicates the time axis. In FIG. 6, the reference numerals 201, 202, 203, ... and 20k denote the G field image that have been captured and read at regular time intervals. Also, in FIG. 6, the solid lines indicate the lines on which the read operation is actually performed on the G imager, while the dashed lines indicate the lines on which the read operation is not performed on the G imager.

In the example shown in FIG. 6, the lines to read change every field and have a cycle time of three fields. That is to say, all pixels in one frame are read as three fields that have mutually different lines to read. According to such a multi-interlaced reading technique, if the read rate (represented by the number of pixels to be read per second) remains the same, the number of pixels included in a picture at each point in time decreases. As a result, the spatial resolution decreases but the temporal resolution of the moving picture can be increased. Such reading with decimation is performed on G only. As for the R and B, on the other hand, every pixel is read using imagers that have a lower resolution and a bigger pixel size than G.

In this preferred embodiment, to enhance the effect of the temporal and spatial resolution increasing processing done by the signal processing section 104, the order of interlacing is defined so that the positions of the pixels to read remain the same in the temporal and spatial ranges.

Hereinafter, this point will be described with reference to FIG. 7, which shows an exemplary order of interlacing in a situation where n=8 and schematically illustrates the image capturing plane of the imager 301.

Figure 7:
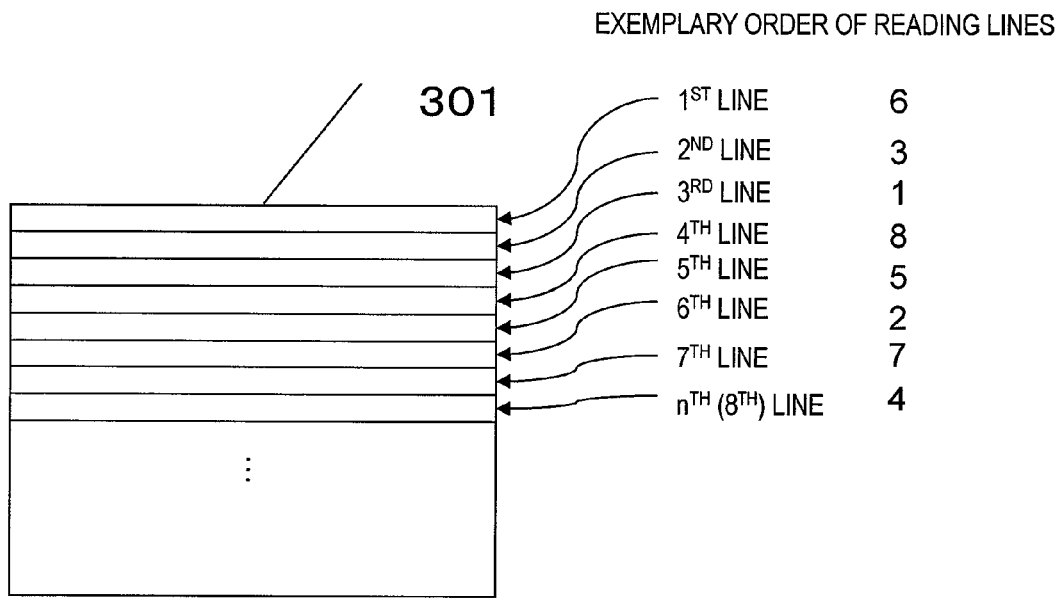
FIG. 7 shows an exemplary order of interlacing.
Figure 8:
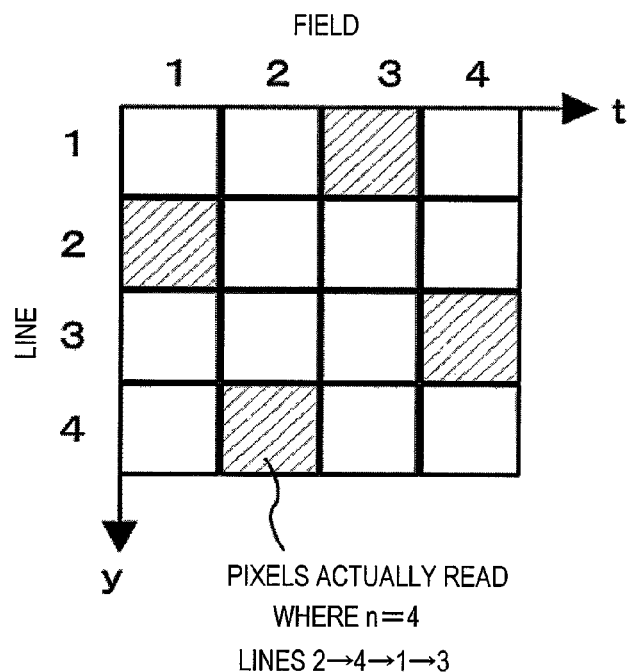
FIG. 8 shows an exemplary order of reading lines in a situation where n=4.

In the example illustrated in FIG. 7, the order of reading is defined such that reading is started on the third line and is carried out every eighth line after that for the first field, and that reading is started on the sixth line and is carried out every eighth line after that for the second field, and that reading is started on the second line and is carried out every eighth line after that for the third field. That is to say, the lines to read are defined so as not to be continuous with each other between adjacent fields.

Figure 9:
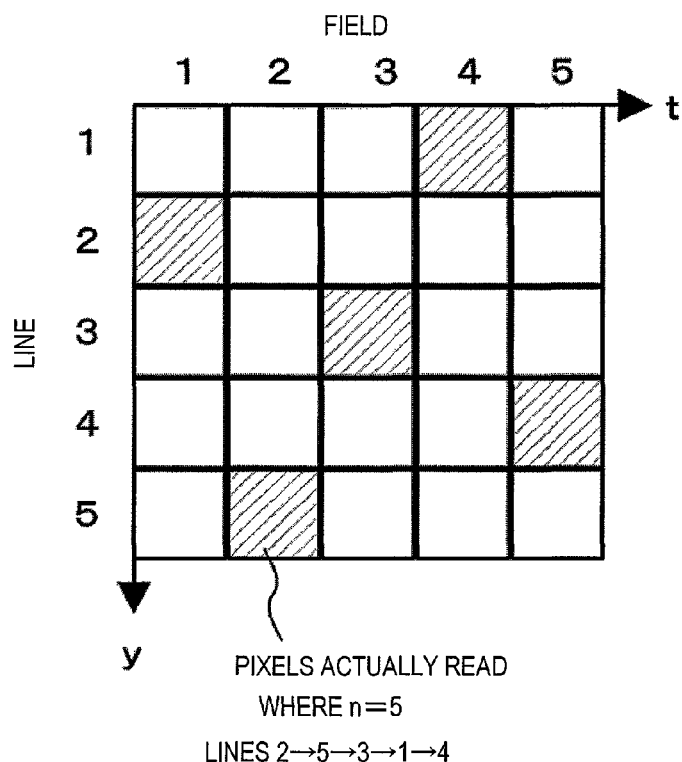
FIG. 9 shows an exemplary order of reading lines in a situation where n=5.
Figure 10:
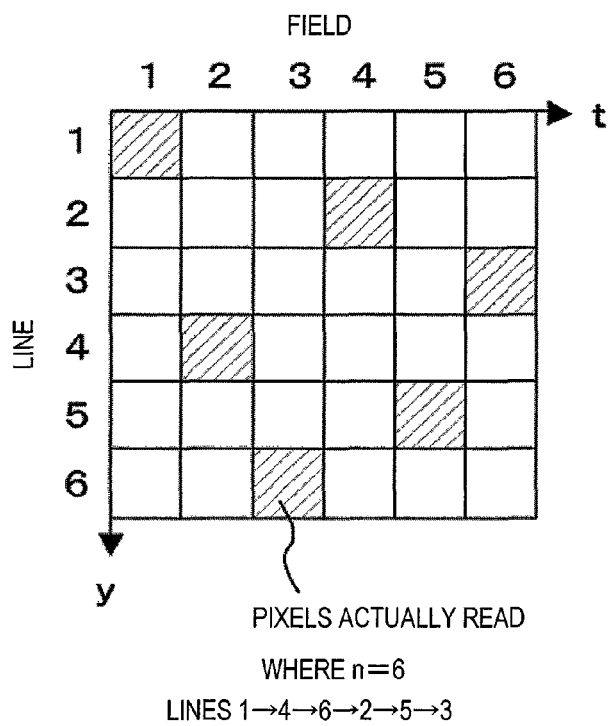
FIG. 10 shows an exemplary order of reading lines in a situation where n=6.
Figure 11:
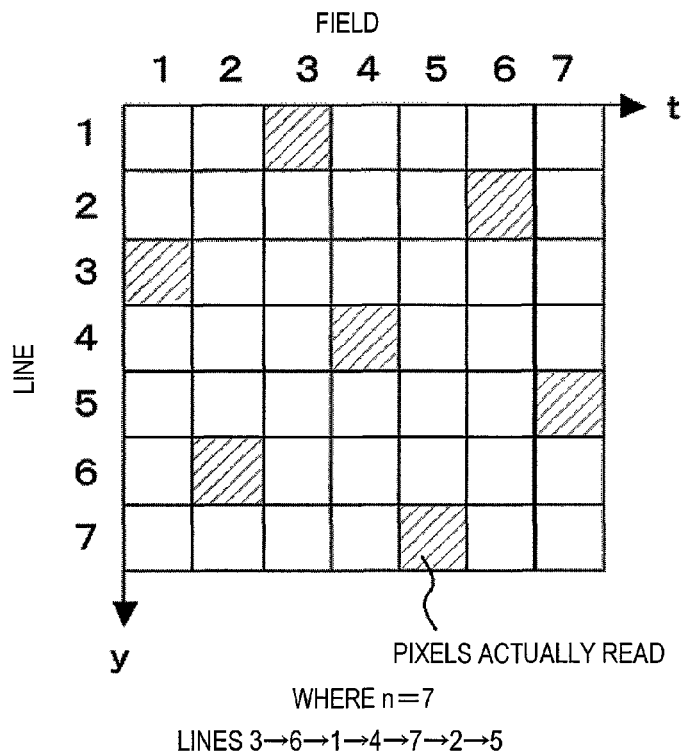
FIG. 11 shows an exemplary order of reading lines in a situation where n=7.
Figure 12:
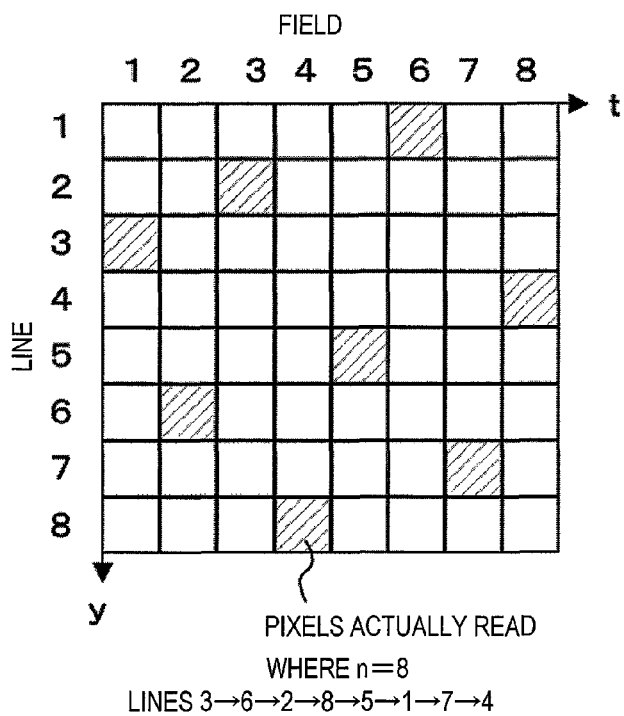
FIG. 12 shows an exemplary order of reading lines in a situation where n=8.

Next, it will be described with reference to FIGS. 8 through 13 how the order of interlacing may be determined so that the positions of the pixels to read remain the same in the temporal and spatial ranges. In those drawings, the order of the lines to read is indicated on a two-dimensional plane defined by the y direction (i.e., the direction in which the lines of pixels are counted on each image) and the t direction (i.e., the direction in which fields appear one after another along the time axis), and the (lines of) pixels to be read actually are shadowed. FIGS. 8 to 13 show pixels in only n lines and n fields. When the pixels are read actually, however, the illustrated pattern may be used by expanding it temporally and spatially on the yt plane. Among these drawings, FIG. 9 illustrates a situation where n=7, for example, in which the order of reading lines is defined to be 3→6→1→4→7→2→5, for example.

The order of reading such as the ones shown in FIGS. 8 to 13 may be determined in the following manner, for example. Specifically, by paying attention to the distance d between a pixel to interpolate (i.e., a non-shadowed pixel) and the nearest pixel to read, which will be referred to during the interpolation (i.e., a shadowed pixel), as represented by the following Equation (1):

$$d^2 = (y_s - y)^2 + \lambda^2 (t_s - t)^2 \quad (1)$$

where (y, t) is the coordinates of the pixel to interpolate, (ys, ts) is the coordinates of a reference pixel that will minimize the distance d, and $\lambda$ is a weight coefficient, the order of reading may be determined so as to minimize the average of the distances d of all pixels to interpolate. Alternatively, by paying attention to the distance d between two pixels to read as represented by the following Equation (1A):

$$d^2 = (y_{sm} - y_s)^2 + \lambda^2 (t_{sm} - t_s)^2 \quad (1A)$$

where (ys, ts) is the coordinates of the pixel to read and (ysm, tsm) is the coordinates of another pixel to read that is located closest to the former pixel to read represented by (ys, ts), the order of reading may also be determined so as to minimize the average of the distances d of all pixels to read.

In the example described above, situations where n=4 to 9 have been described. Even if n is equal to any other value, however, the order of interlacing can also be determined by the technique described above so that the positions of the pixels to read remain the same in the temporal and spatial ranges.

FIG. 4 illustrates a situation where a reading system of just one channel is used. Alternatively, the spatial resolution of the G moving picture may also be increased by a reading system of two channels that includes two imagers 401 and 402 as shown in FIG. 14.

The writing control section 102 writes the G multi-interlaced pictures and the R and G all pixel read pictures that have been obtained by the image capturing section 101 onto the memory 103. If a delay of several fields is permitted, n fields including the current field and its preceding and succeeding fields are preferably stored in the memory 103. On the other hand, if no delay is permitted, then the current field and n fields that precede the current one are preferably stored in the memory.

Next, it will be described with reference to FIGS. 15 through 18 how and why such a high resolution is realized by the decimation processing.

Figure 15:
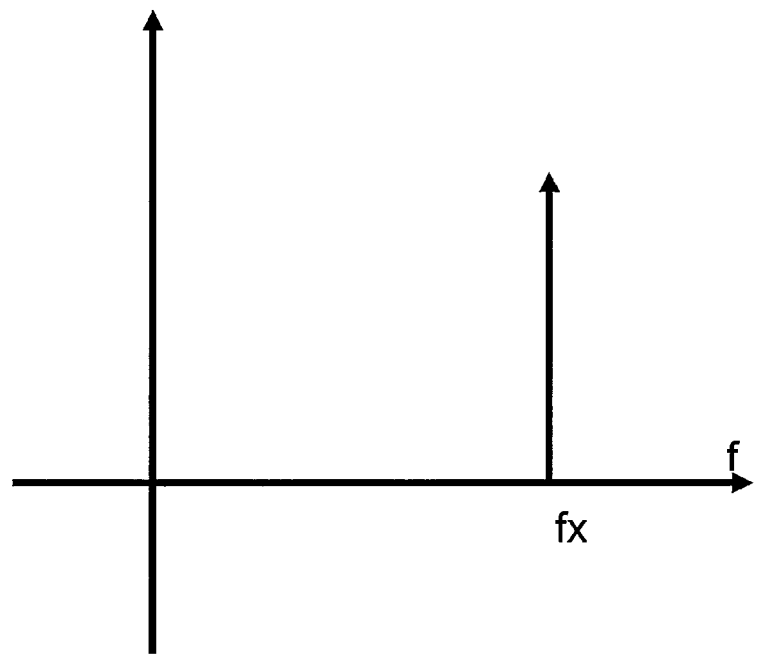
FIG. 15 shows the spectrum of a sine wave in a frequency range.
Figure 16:
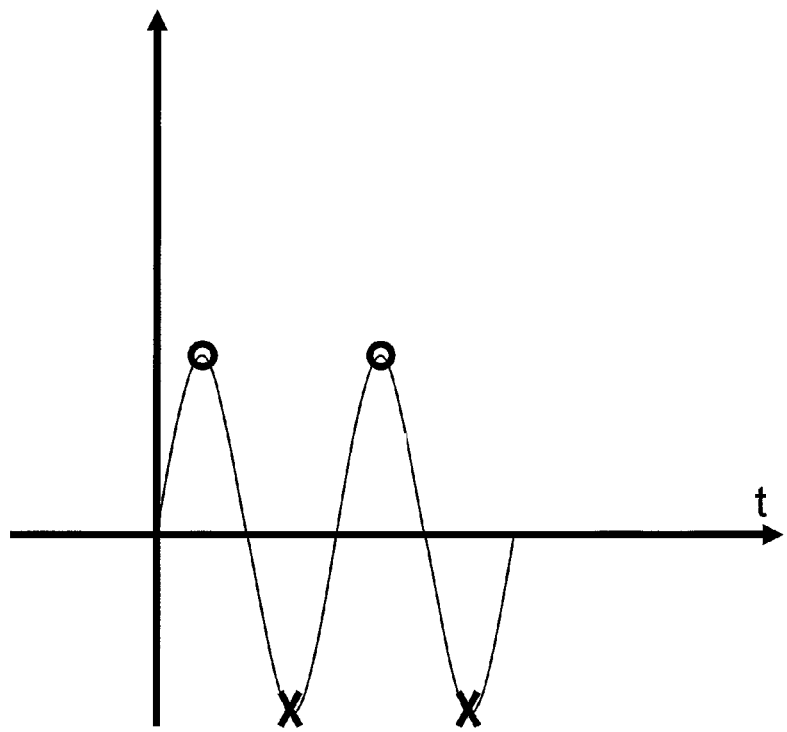
FIG. 16 shows a sine wave in a time range.

FIG. 15 shows the spectrum of a sine wave in a frequency range. FIG. 16 is a graph showing a sine wave with a frequency fx. In FIG. 16, the abscissa represents the time and the ordinate represents the luminance, for example. Suppose this sine wave is sampled at a particular frequency. If the sampling rate is equal to the frequency fx of the sine wave, then the sine wave may be sampled at the points indicated by the open circles ○ in FIG. 16. Since the sampled signal will be on the line that connects together those points indicated by the open circles ○, the spectrum in its frequency range is equal to the frequency f1 shown in FIG. 17.

Figure 17:
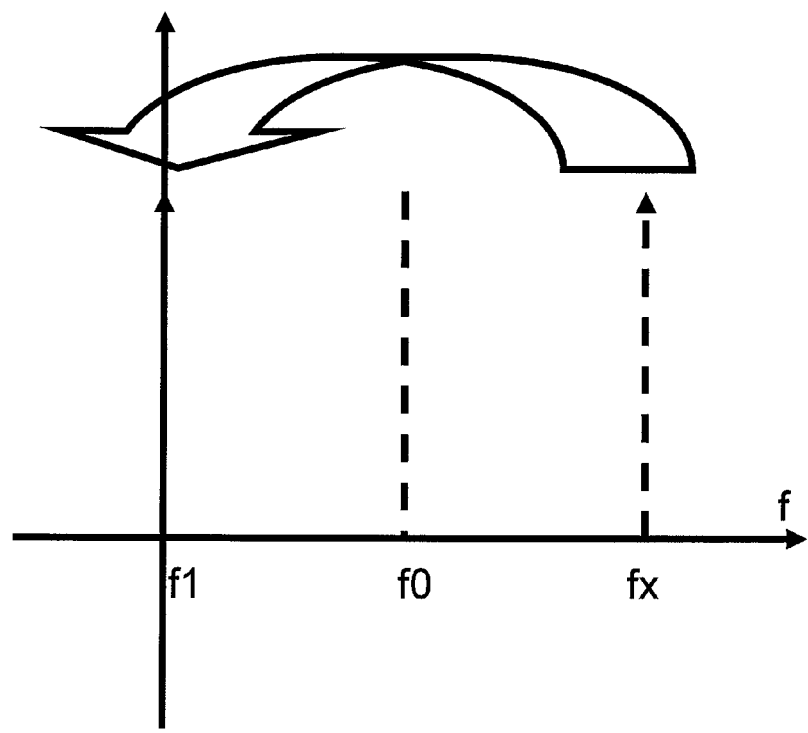
FIG. 17 shows the definition of aliasing with respect to a Nyquist rate.

FIG. 17 shows a Nyquist rate f0, which is a half of the sampling rate fx. Since the frequency f1 of the sampled signal is located at a position that is the opposite of the frequency fx of the sine wave with respect to the Nyquist rate f0, that frequency f1 is called an "aliasing component". That is to say, the high frequency components falling within the range from the Nyquist rate f0 through the sine wave frequency fx turn into low-frequency components that are equal to or lower than the Nyquist rate (i.e., aliasing noise). If a signal generated by superposing a lot of sine waves with mutually different frequencies one upon the other is sampled, then the frequencies of the signal to be sampled will have a distribution. That is why if such a signal were sampled at a particular frequency (fx), then the aliasing noise would be generated due to the high frequency components falling within the range from the Nyquist rate f0, which is a half of that particular frequency fx, through the sampling rate fx and would be superposed on the natural low-frequency components.

In the graph shown in FIG. 16, its abscissa represents the time t. However, this abscissa could also be considered the vertical axis of coordinates on the image capturing plane. In that case, the sine wave shown in FIG. 16 would be a signal waveform representing the spatial distribution of luminances on the axis of coordinates. The spatial frequencies of a two-dimensional image to be actually produced on an imager also have a distribution. And if such an image is sampled using only a finite number of pixels thereof, then the high-frequency components that exceed the Nyquist rate will also be superposed as aliasing noise on the low-frequency components.

If the sine wave shown in FIG. 16 is sampled at the sampling rate fx, the sampling may also be carried out at the points indicated by the crosses x shown in FIG. 16. Those points indicated by the crosses x are shifted from the points indicated by the open circles ○ by a half period on the time axis. Even so, the frequency of the signal obtained by sampling will also be represented by the frequency f1 shown in FIG. 17 as in the situation where the sampling is carried out at the open circles ○.

Figure 18:
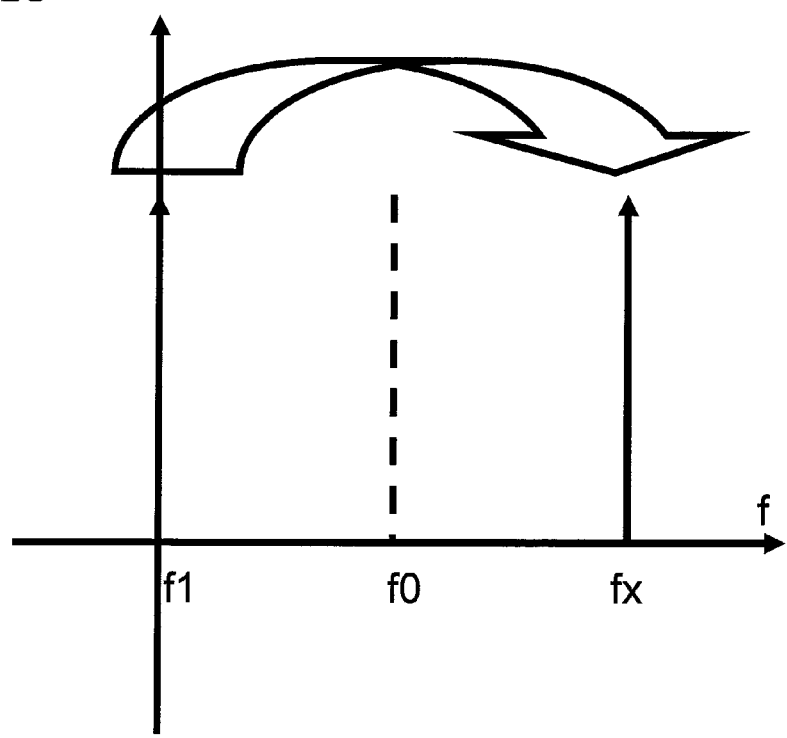
FIG. 18 shows how to restore high-frequency components.

If the relative positions of the images with such aliasing components are known, then the original high-frequency components (represented by the frequency fx) can be obtained as shown in FIG. 18. That is to say, by connecting together the open circle points ○ shown in FIG. 16 (and represented by the frequency f1) and the cross points x (represented by the frequency f1) together, the original sine wave (represented by the frequency fx) can be restored. That is to say, the original signal can be restored by using the data sampled at the open circle points ○ and the data sampled at the cross points x.

As can be seen easily from the foregoing description, according to this preferred embodiment, by using a number of field images that have been obtained by performing decimation processing (or multi-interlacing), an image with a higher resolution (i.e., a higher spatial frequency) can be restored. And to restore such a high-resolution picture, the aliasing noise included in each of those field images is used. Such a restoration can be done perfectly on a still picture. In a situation where the object is in motion, however, motion compensation needs to be carried out.

Hereinafter, a specific technique for increasing the resolution according to this preferred embodiment will be described.

Increase G Resolution

The signal processing section 104 reads the 1 to n interlaced picture for G and the all pixel read pictures for R and B that are stored in the memory 103 and minimizes the following Equation (2), thereby performing the processing of increasing the temporal and spatial resolutions:

$$|Hf - g|^M + Q \quad (2)$$

In Equation (2), H represents the sampling process, f represents the G picture to be restored with a high spatial resolution and a high temporal resolution, g represents the 1 to n interlaced picture for G that has been captured by the image capturing section 101, M represents the exponent, and Q represents a condition to be satisfied by the image f to be restored (i.e., a constraint).

In this equation, f and g are column vectors, of which the elements are the respective pixel values of a moving picture. If the pixel values are luminance values, a single value may be assigned to each pixel. Supposing the moving picture to be restored is made up of 30 frames, each consisting of 2,000 horizontal pixels by 1,000 vertical pixels, the number of elements of f becomes 2,000×1,000×30=60,000,000.

If n=10 and 1 to 10 interlaced capturing is carried out, then the number of elements of g becomes 6,000,000, which is one tenth of that of g. The numbers of vertical and horizontal pixels and the number of frames for use in signal processing for f are set by the setting section 105. The sampling process H is defined so that f is sampled in a period of n fields. H is a matrix, of which the number of rows is equal to the number of elements of g and the number of columns is equal to the number of elements of f.

In computers that are currently used extensively around the world, the amounts of information about the number of pixels of a moving picture (consisting of 2,000 horizontal pixels by 1,000 vertical pixels, for example) and the number of frames (e.g., 30 frames) thereof are too much to figure out f that will minimize Equation (2) by a single process. In that case, by performing the processing of obtaining a portion of f for temporally and spatially partial areas a number of times, the moving picture f to be restored can be figured out.

Next, it will be described using a simple example how to formulate the sampling process H. If a picture made up of two frames (i.e., t=1, 2), each consisting of two horizontal pixels (i.e., x=1, 2) by two vertical pixels (i.e., y=1, 2), is sampled by 1 to 2 (i.e., n=2) interlacing, then $$f = (I_{111}\ I_{211}\ I_{121}\ I_{221}\ I_{112}\ I_{212}\ I_{122}\ I_{222})^T \quad (3)$$

$$H = \begin{pmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix} \quad (4)$$

and therefore, the sampling process is formulated as:

$$g = Hf \quad (5)$$

$$= \begin{pmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$(I_{111}\ I_{211}\ I_{121}\ I_{221}\ I_{112}\ I_{212}\ I_{122}\ I_{222})^T$$

$$= (I_{111}\ I_{211}\ I_{122}\ I_{222})^T$$

In Equation (3), I represents the G value of each pixel and the three subscripts attached to I represent the x, y and t values in this order. As g is a picture that has been generated by 1 to n interlacing, its number of pixels is n times as small as that of the all pixel read image.

The value of the exponent M in Equation (2) is not particularly limited but is preferably one or two, considering the complexity of computations.

Equation (5) shows a process for obtaining g by performing interlaced sampling on f. Conversely, a problem for restoring f from g is usually called a "reverse". If there no constraints Q, there are an infinite number of f that will minimize $$|Hf-g|^M \quad (6)$$

because non-sampled pixel values may have any arbitrary values. That is why no unique solution can be obtained for f just by minimizing this Equation (6).

For that reason, to obtain a unique solution for f, a smoothness constraint on the distribution of pixel values f and a smoothness constraint on the distribution of image motions obtained from f are imposed as Q.

As the smoothness constraint on the distribution of pixel values f, $$Q = \left|\frac{\partial f}{\partial x}\right|^m + \left|\frac{\partial f}{\partial y}\right|^m \quad (7)$$

or $$Q = \left|\frac{\partial^2 f}{\partial x^2}\right|^m + \left|\frac{\partial^2 f}{\partial y^2}\right|^m \quad (8)$$

may be used.

In these Equations (7) and (8), $\partial f/\partial x$ is a column vector, of which the elements are the first-order differential values in the x direction of the pixel values I (x, y, t) in respective pixels of the moving picture to be restored. $\partial f/\partial y$ is a column vector, of which the elements are the first-order differential values in the y direction of the pixel values I (x, y, t) in the respective pixels of the moving picture to be restored. $\partial^2 f/\partial^2 x$ is a column vector, of which the elements are the second-order differential values in the x direction of the pixel values I (x, y, t) in the respective pixels of the moving picture to be restored. $\partial^2 f/\partial^2 y$ is a column vector, of which the elements are the second-order differential values in the y direction of the pixel values I (x, y, t) in the respective pixels of the moving picture to be restored. ∥ represents the norm of the vector. The value of the exponent m is preferably one or two just like the exponent M in Equations (2) and (6).

As the smoothness constraint on the distribution of the pixel value I of the picture f, not just the one represented by Equation (7) or (8) but also the $m^{th}$ power of the absolute value of the second-order directional derivative as represented by the following Equation (9) may be used as well:

$$Q = \left|\frac{\partial}{\partial n_{min}}\left(\frac{\partial f}{\partial n_{min}}\right)\right|^m \quad (9)$$

$$= \left|\frac{\partial}{\partial n_{min}}\left(-\sin\theta\frac{\partial f}{\partial x} + \cos\theta\frac{\partial f}{\partial y}\right)\right|^m$$

$$= \left|\begin{array}{l}-\sin\theta\frac{\partial}{\partial x}\left(-\sin\theta\frac{\partial f}{\partial x} + \cos\theta\frac{\partial f}{\partial y}\right) + \\ \cos\theta\frac{\partial}{\partial y}\left(-\sin\theta\frac{\partial f}{\partial x} + \cos\theta\frac{\partial f}{\partial y}\right)\end{array}\right|^m$$

$$= \left|\sin^2\theta\frac{\partial^2 f}{\partial x^2} - \sin\theta\cos\theta\frac{\partial^2 f}{\partial x\partial y} - \sin\theta\cos\theta\frac{\partial^2 f}{\partial y\partial x} + \cos^2\theta\frac{\partial^2 f}{\partial y^2}\right|^m.$$

In Equation (9), the vector $n_{min}$ and angle θ define the direction in which the square of the first-order directional derivative becomes minimum and satisfy the following Equation (10):

$$n_{min} = \left( \frac{-\frac{\partial I}{\partial y}}{\sqrt{\left(\frac{\partial I}{\partial x}\right)^2 + \left(\frac{\partial I}{\partial y}\right)^2}} \quad \frac{\frac{\partial I}{\partial x}}{\sqrt{\left(\frac{\partial I}{\partial x}\right)^2 + \left(\frac{\partial I}{\partial y}\right)^2}} \right)^T \quad (10)$$
$$= (-\sin\theta \quad \cos\theta)^T$$

Alternatively, the smoothness constraint on the distribution of the pixel values I of the picture f may also be represented by:

$$Q = w(x, y) \left| \left(\frac{\partial f}{\partial x}\right)^2 + \left(\frac{\partial f}{\partial y}\right)^2 \right| \quad (11)$$

or $$Q = w(x, y) \left| \left(\frac{\partial^2 f}{\partial x^2}\right)^2 + \left(\frac{\partial^2 f}{\partial y^2}\right)^2 \right| \quad (12)$$

or $$Q = w(x, y) \left| \frac{\partial}{\partial n_{min}} \left(\frac{\partial f}{\partial n_{min}}\right) \right|^m \quad (13)$$

so that the constraints are changed adaptively according to the gradient of the pixel values of f. In these equations, w (x, y) is a function representing the gradient of the pixel values and is a weight function with respect to the constraint. For example, if the sum of the $m^{th}$ powers of the gradient components of the pixel values represented by $$\left|\frac{\partial I}{\partial x}\right|^m + \left|\frac{\partial I}{\partial y}\right|^m \quad (14)$$

is large, then the w (x, y) value is preferably small. Otherwise, the w (x, y) value is preferably large. In that case, the constraints can be changed adaptively according to the luminance gradient of f. By introducing such a weight function, it is possible to prevent the picture f to be restored from being smoothed out excessively.

Optionally, the weight function w (x, y) may also be defined by the magnitude of the $m^{th}$ power of the directional derivative represented by the following Equation (15):

$$\left|\frac{\partial I}{\partial n_{max}}\right|^m = \left|\cos\theta \frac{\partial I}{\partial x} + \sin\theta \frac{\partial I}{\partial y}\right|^m \quad (15)$$

instead of the magnitude of the sum of the squares of the luminance gradient components as represented by Equation (7).

In Equation (15), the vector $n_{max}$ and angle θ define the direction in which the directional derivative becomes maximum and satisfy the following Equation (16):

$$n_{max} = \left( \frac{\frac{\partial I}{\partial x}}{\sqrt{\left(\frac{\partial I}{\partial x}\right)^2 + \left(\frac{\partial I}{\partial y}\right)^2}} \quad \frac{\frac{\partial I}{\partial y}}{\sqrt{\left(\frac{\partial I}{\partial x}\right)^2 + \left(\frac{\partial I}{\partial y}\right)^2}} \right)^T = (\cos\theta \quad \sin\theta)^T \quad (16)$$

The problem for solving Equation (2) by introducing smoothness constraints on the distribution of the pixel values I of the moving picture f as already described using Equations (7) to (9) and Equations (11) to (13) can be solved by a known solution (i.e., a solution to a variational problem such as a finite element method).

As the smoothness constraint on the distribution of motions in the images included in f, $$Q = \left|\frac{\partial u}{\partial x}\right|^m + \left|\frac{\partial u}{\partial y}\right|^m + \left|\frac{\partial v}{\partial x}\right|^m + \left|\frac{\partial v}{\partial y}\right|^m \quad (17)$$

or $$Q = \left|\frac{\partial^2 u}{\partial x^2}\right|^m + \left|\frac{\partial^2 u}{\partial y^2}\right|^m + \left|\frac{\partial^2 v}{\partial x^2}\right|^m + \left|\frac{\partial^2 v}{\partial y^2}\right|^m \quad (18)$$

can be used.

In Equations (17) and (18), u represents a column vector, of which the elements are the x-direction components of the motion vectors of respective pixels obtained from the moving picture f, and v represents a column vector, of which the elements are the y-direction components of the motion vectors of the respective pixels obtained from the moving picture f.

The smoothness constraint on the distribution of motions in the images obtained from f does not have to be represented by Equation (17) or (18) but may also be the first- or second-order directional derivative as represented by the following Equation (19) or (20):

$$Q = \left|\frac{\partial u}{\partial n_{min}}\right|^m + \left|\frac{\partial v}{\partial n_{min}}\right|^m \quad (19)$$

$$Q = \left|\frac{\partial}{\partial n_{min}}\left(\frac{\partial u}{\partial n_{min}}\right)\right|^m + \left|\frac{\partial}{\partial n_{min}}\left(\frac{\partial v}{\partial n_{min}}\right)\right|^m \quad (20)$$

Still alternatively, the constraints defined by Equations (17) to (20) may also be changed adaptively according to the gradient of the pixel values of f as represented by the following Equations (21) to (24):

$$Q = w(x, y)\left(\left|\frac{\partial u}{\partial x}\right|^m + \left|\frac{\partial u}{\partial y}\right|^m + \left|\frac{\partial v}{\partial x}\right|^m + \left|\frac{\partial v}{\partial y}\right|^m\right) \quad (21)$$

$$Q = w(x, y)\left(\left|\frac{\partial^2 u}{\partial x^2}\right|^m + \left|\frac{\partial^2 u}{\partial y^2}\right|^m + \left|\frac{\partial^2 v}{\partial x^2}\right|^m + \left|\frac{\partial^2 v}{\partial y^2}\right|^m\right) \quad (22)$$

$$Q = w(x, y)\left(\left|\frac{\partial u}{\partial n_{min}}\right|^m + \left|\frac{\partial v}{\partial n_{min}}\right|^m\right) \quad (23)$$

$$Q = w(x, y)\left(\left|\frac{\partial}{\partial n_{min}}\left(\frac{\partial u}{\partial n_{min}}\right)\right|^m + \left|\frac{\partial}{\partial n_{min}}\left(\frac{\partial v}{\partial n_{min}}\right)\right|^m\right) \quad (24)$$

In Equations (21) to (24), w (x, y) is identical with the weight function on the gradient of the pixel values of f and may be defined by either the sum of the squares of the gradient components of the pixel values as represented by Equation (7) or the squares of the directional derivatives as represented by Equation (12).

By introducing such a weight function, it is possible to prevent the motion information of f from being smoothed out excessively. As a result, the picture f to be restored will not be smoothed out more than necessarily.

The problem for solving Equation (2) by introducing the smoothness constraints on the distribution of motions obtained from the picture f as represented by Equations (17) to (24) would require more complicated calculations than a situation where the smoothness constraint on f are used. This is because the picture f to be restored and the motion information (u, v) mutually depend on each other.

However, such a problem can be solved by a known solution (e.g., a solution to a variational problem that uses an EMS algorithm). In that case, the initial values of the picture f to be restored and the motion information (u, v) are needed to make the iterative calculations. As the initial value of f, an interpolated and enlarged version of the input image may be used.

On the other hand, as the initial value of the motion information (u, v), a result of motion detection on an input image with aliasing information had to be used according to the conventional method. In that case, the aliasing components make noise for the motion detection, thus making it difficult to obtain an accurate result of motion detection. Consequently, the image quality will decline as a result of the super-resolution processing.

Meanwhile, according to this preferred embodiment, the G picture is captured by multi-interlacing, while every pixel of the R and B pictures is read with low resolution, though. And the motion estimating section 107 detects motion information from the R and B pictures, of which every pixel has been read, by a known motion estimation method such as block matching. That is why compared to the conventional method of motion estimation on a multi-interlaced picture, more accurate motion information can be obtained. As a result, if the image generating section 108 solves Equation (2) by introducing the smoothness constraints on the distribution of motions obtained from the picture f as represented by Equations (7) through (24), the image quality can be improved as a result of the super-resolution processing.

The processing may get done by the image generating section 108 using, in combination, the smoothness constraint on the distribution of pixel values as represented by any of Equations (7) to (9) and (11) to (13) and the smoothness constraint on the distribution of motions as represented by any of Equations (17) to (24) as in the following Equation (25):

$$Q=\lambda_1 Q_f + \lambda_2 Q_{uv} \qquad (25)$$

In Equation (25), Qf represents the smoothness constraint on the gradient of the pixel values of f, Quv represents the smoothness constraint on the distribution of motions in images obtained from f, and λ1 and λ2 represent weights on the constraints on Qf and Quv.

This problem for solving Equation (2) by introducing both the smoothness constraint on the distribution of the pixel values and the smoothness constraint on the distribution of motions in the images can also be solved by a known solution (e.g., a solution to a variational problem that uses an EMS algorithm).

Also, the constraint on the motion does not have to be the one on the smoothness of the distribution of motion vectors represented by Equations (17) to (24) but may also be defined so as to reduce the residual error between two associated points (i.e., the difference in pixel value between the start and end points of a motion vector) to be used as an estimated value. If f is represented by a continuous function f (x, y, t), then the residual error between the associated points is given by:

$$f(x+u, y+v, t+\Delta t) - f(x, y, t) \qquad (26)$$

Considering the entire picture with f supposed to be a vector, the residual error of each pixel can be represented as the vector $$H_m f \qquad (27)$$

And the residual sum of squares can be represented by $$(H_m f)^2 = f^T H_m^T H_m f \qquad (28)$$

In Equations (27) and (28), $H_m$ represents a matrix, of which the number of elements is equal to the number of elements of the vector f (i.e., the total number of pixels in the temporal and spatial ranges) multiplied by the number of elements of f. On each row of $H_m$, only the elements corresponding to the start and end points of the motion vector have non-zero values and the other elements are zero. If the motion vector has an integral precision, the elements corresponding to the start and end points have values of −1 and 1, respectively, and the other elements are zero.

If the motion vector has a subpixel precision, then multiple elements corresponding to multiple pixels in the vicinity of the end point will have non-zero values according to the value of the subpixel component of the motion vector.

With Qm supposed to be calculated by Equation (28), the constraint may also be defined by the following Equation (29):

$$Q=\lambda_1 Q_f + \lambda_2 Q_{uv} + \lambda_3 Q_m \qquad (29)$$

where λ3 represents the weight on the constraint Qm.

Increase R and B Resolutions

By using the motion information that the motion estimating section 107 has extracted from the R and B low-resolution moving pictures by the method described above, the image generating section 108 can increase the resolution of the 1 to n interlaced moving picture for G.

The R and B pictures are interpolated and enlarged by the multi-color image synthesizing section 109, the resultant pictures are synthesized with the G picture that has had its resolution increased, and then the synthetic image thus obtained is output. In this manner, an image with an increased resolution (e.g., the output image 402 shown in FIG. 4) can be output as a color picture.

Figure 19:
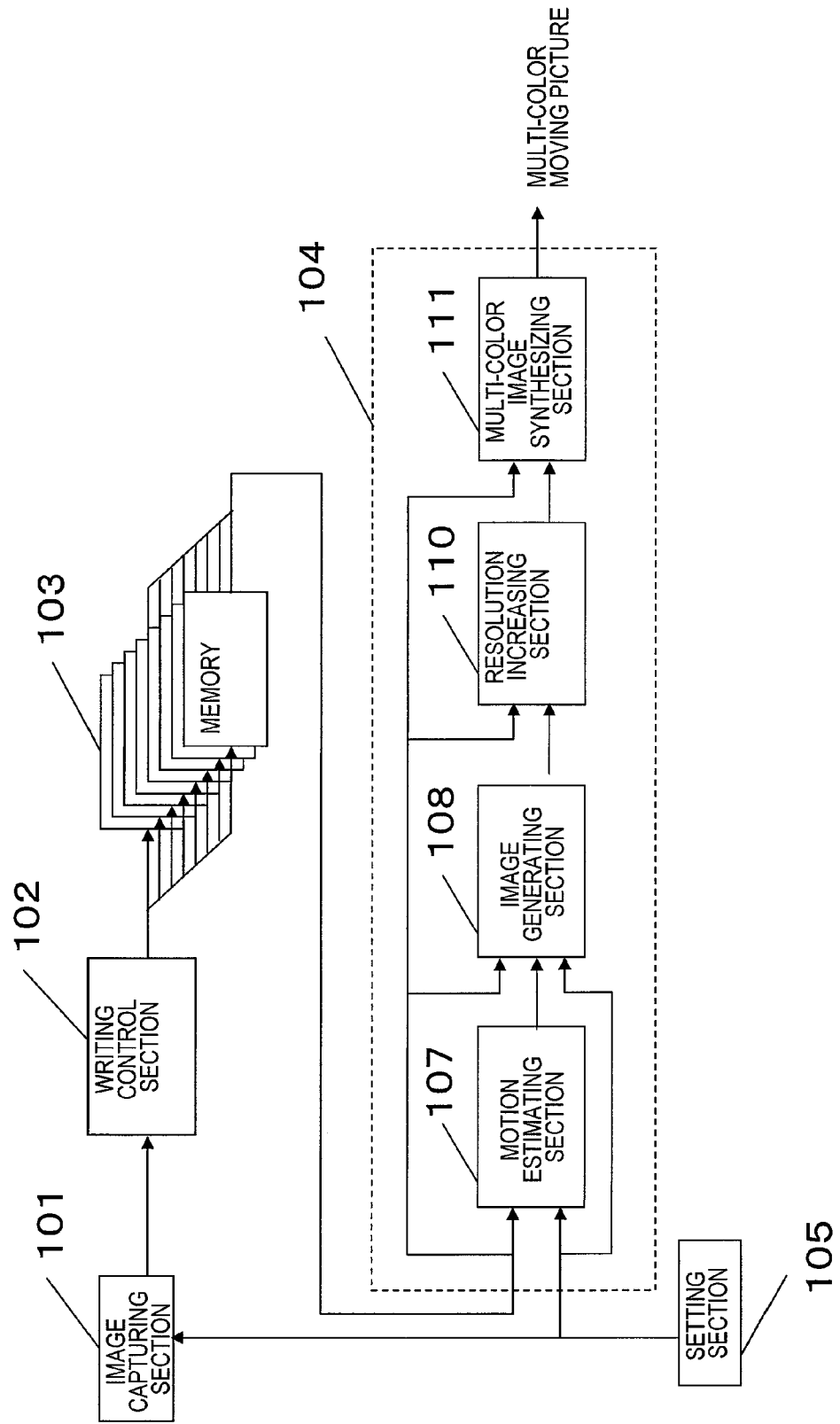
FIG. 19 is a block diagram of an image capture device according to the first preferred embodiment of the present invention.

If a resolution increasing section 110 is newly provided to superpose the high-frequency components of the G picture that has had its resolution increased on the R and B pictures that have been interpolated and enlarged as shown in FIG. 19, then the multi-color image synthesizing section 111 may also perform the following processing. For example, if the picture generated by the resolution increasing section 110 and the G picture that has had its resolution increased as described above are synthesized together and if the synthetic image thus obtained is output, an image with a further increased resolution can be output as a color picture by performing simple processing. In that case, if the amplitude of the high-frequency components to superpose is controlled in accordance with the local correlation between R, G and B in non-high-frequency ranges (i.e., in middle and low frequency ranges), then the resolution increasing processing can get done with the naturalness of colors maintained and with the generation of false colors minimized.

In this preferred embodiment, the R and B low-resolution pictures are supposed to be captured by elements that are arranged at optically the same position for the sake of simplicity. However, this is just an example. Alternatively, if the R and B pictures are shifted from each other by a half pixel (i.e., so-called "pixel shifting" is adopted), the result of motion estimation can have an increased spatial resolution. As a result, the resolution of the G image can be increased with more stability.

On top of that, the resolutions of the R and B images are also increased with the high-frequency components of G superposed thereon. As a result, the resolutions of the R and B images can also be increased with more stability.

It should be noted that the image generating section 108 does not have to calculate the G, R and B pixel values as described above. Alternatively, the R, G and B pixel values could also be calculated simultaneously in the following manner, for example.

Figure 38:
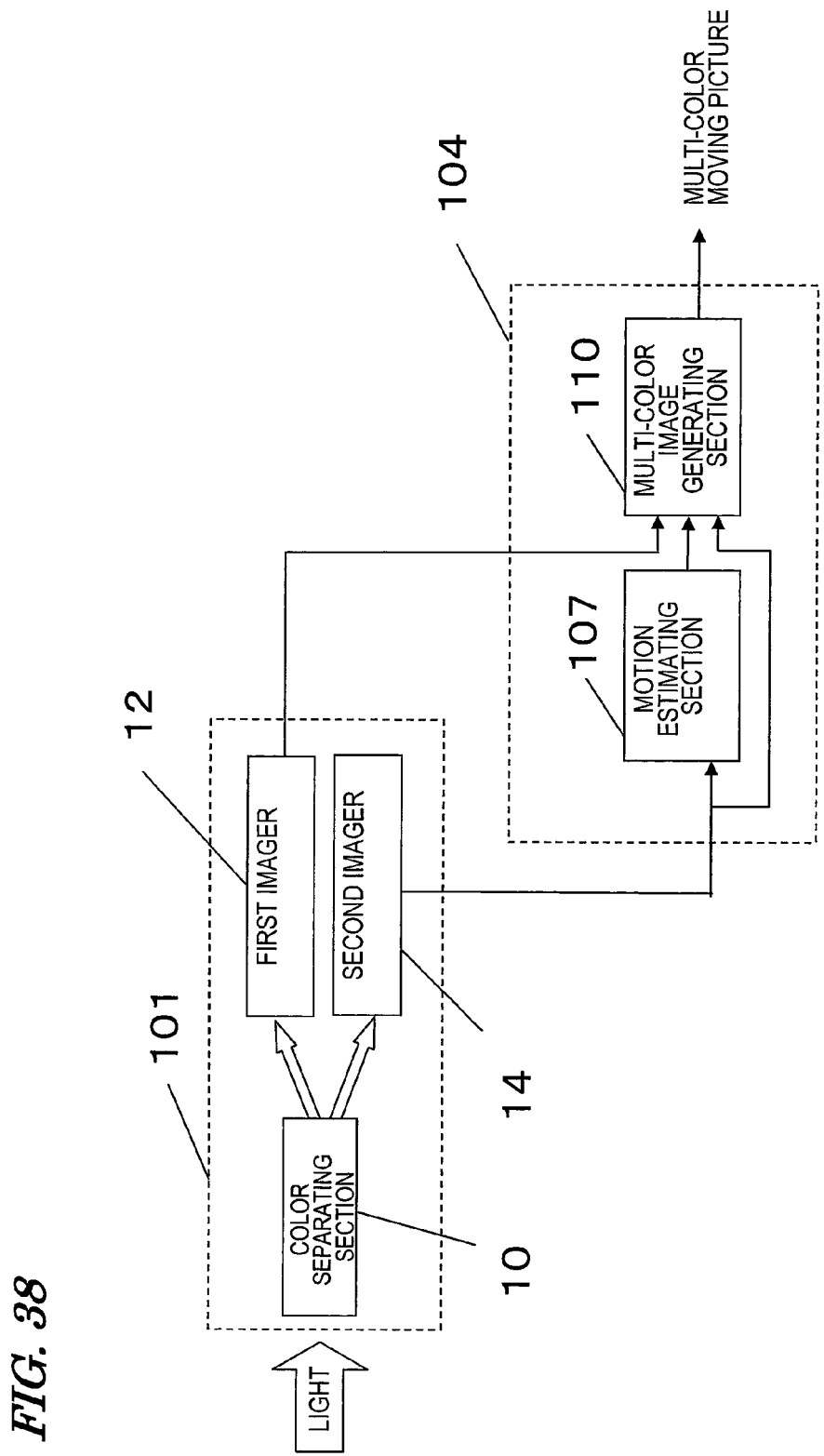
FIG. 38 illustrates a configuration for a multi-color image processor that calculates R, G and B pixel values at the same time.

FIG. 38 illustrates a configuration for a multi-color image processor that calculates the R, G and B pixel values at the same time. In FIG. 38, any component having substantially the same function as the counterpart shown in FIG. 1 is identified by the same reference numeral, and the description of its counterpart will be omitted herein to avoid redundancies. Hereinafter, it will be described in detail exactly how this multi-color image processor 110 operates.

The image generating section 110 defines an estimation function J, representing the degree of similarity between the spatial variation patterns of pictures in respective colors in the target color picture g, and generates the target picture g so as to minimize the estimation function J. In this case, if the spatial variation patterns are similar to each other, it means that the spatial variations of the blue, red and green pictures are close to each other. An example of such an estimation function J is represented by the following Equation (30):

$$J(g) = \|H_R R_H - R_L\|^2 + \|H_G G_H - G_L\|^2 + \|H_B B_H - B_L\|^2 + \lambda_\theta \|Q_S C_\theta g\|^p + \lambda_\phi \|Q_S C_\phi g\|^p + \lambda_r \|Q_S C_r g\|^p \quad (30)$$

The estimation function J is defined as a function of the red, green and blue pictures (which are represented by image vectors $R_H$, $G_H$ and $B_H$, respectively) that will eventually form the high-resolution color picture (i.e., target picture) g to generate. In Equation (30), $H_R$, $H_G$ and $H_B$ represent the conversion from the high resolutions of the pictures in respective colors $R_H$, $G_H$ and $B_H$ that form the target picture g into the low resolutions of the pictures in the respective colors $R_L$, $G_L$ and $B_L$ (represented by vectors) in the input picture. Also, $H_R$, $H_G$ and $H_B$ may be conversions into low resolutions as represented by the following Equations (31), (32) and (33):

$$R_L(x_{RL}, y_{RL}) = \sum_{(x',y') \in C} w_R(x', y') \cdot R_H(x(x_{RL}) + x', y(y_{RL}) + y') \quad (31)$$

$$G_L(x_{GL}, y_{GL}) = \sum_{(x',y') \in C} w_G(x', y') \cdot G_H(x(x_{GL}) + x', y(y_{GL}) + y') \quad (32)$$

$$B_L(x_{BL}, y_{BL}) = \sum_{(x',y') \in C} w_B(x', y') \cdot B_H(x(x_{BL}) + x', y(y_{BL}) + y') \quad (33)$$

The pixel value of the input picture is the sum of the weighted pixel values in a local area, of which the center is defined at a corresponding point on the target picture.

In Equations (31), (32) and (33), $R_H$ (x, y), $G_H$ (x, y), and $B_H$ (x, y) represent the respective pixel values of the red (R), green (G) and blue (B) pixels at a pixel location (x, y) on the target picture g. On the other hand, $R_L$ ($x_{RL}$, $y_{RL}$), $G_L$ ($x_{GL}$, $y_{GL}$), and $B_L$ ($x_{BL}$, $y_{BL}$) represent the respective pixel values of the incoming red picture at a pixel location ($x_{RL}$, $y_{RL}$), the incoming green picture at a pixel location ($x_{GL}$, $y_{GL}$) and the incoming blue picture at a pixel location ($x_{BL}$, $y_{BL}$) x ($x_{RL}$) and y ($y_{RL}$) represent the x and y coordinates of a pixel location on the target picture that corresponds to the pixel location ($x_{RL}$, $y_{RL}$) of the incoming red picture. x ($x_{GL}$) and y ($y_{GL}$) represent the x and y coordinates of a pixel location on the target picture that corresponds to the pixel location ($x_{GL}$, $y_{GL}$) of the incoming green picture. And x ($x_{BL}$) and y ($y_{BL}$) represent the x and y coordinates of a pixel location on the target picture that corresponds to the pixel location ($x_{BL}$, $y_{BL}$) of the incoming blue picture. And $w_R$, $w_G$ and $w_B$ represent the weight functions of the pixel values of the target picture with respect to the pixel values of the incoming red, green and blue pictures. It should be noted that (x', y')∈C indicates a range of the local area in which $w_R$, $w_G$ and $w_B$ are defined.

The sum of the squares of the differences between the pixel values of a picture with a decreased resolution (or a picture with the same resolution as for green) and the input picture at their corresponding pixel locations is defined as an estimation condition for the estimation function (see the first, second and third terms of Equation (39)). That is to say, those estimation conditions are specified by values representing the magnitudes of differences between the vectors of the pixel values of the picture with the decreased resolution as respective elements and the vectors of the pixel values of the input picture as respective elements.

The fourth term $Q_s$ of Equation (30) is an estimation condition for estimating the spatial smoothness of a pixel value. $Q_{s1}$ and $Q_{s2}$, which are examples of $Q_s$, are represented by the following Equation (34) and Equation (35):

$$Q_{s1} = \sum_x \sum_y [\lambda_\theta(x, y) \cdot \{4 \cdot \theta_H(x, y) - \theta_H(x, y-1) - \theta_H(x, y+1) - \theta_H(x-1, y) - \theta_H(x+1, y)\}^2 \\ + \lambda_\varphi(x, y) \cdot \{4 \cdot \varphi_H(x, y) - \varphi_H(x, y-1) - \varphi_H(x, y+1) - \varphi_H(x-1, y) - \varphi_H(x+1, y)\}^2 + \\ \lambda_r(x, y) \cdot \{4 \cdot r_H(x, y) - r_H(x, y-1) - r_H(x, y+1) - r_H(x-1, y) - r_H(x+1, y)\}^2] \quad (34)$$

In Equation (34), $\theta_H$ (x, y), $\psi_H$ (x, y) and $r_H$ (x, y) are coordinates in a situation where a position in a three-dimensional orthogonal color space (i.e., a so-called RGB color space), defined by the red, green and blue pixel values at a pixel location (x, y) on the target picture, is represented by a spherical coordinate system ($\theta$, $\psi$, r) corresponding to the RGB color space. In this case, $\theta_H$(x, y) and $\psi_H$(x, y) represent two arguments and $r_H$ (x, y) represents a radius.

Figure 39:
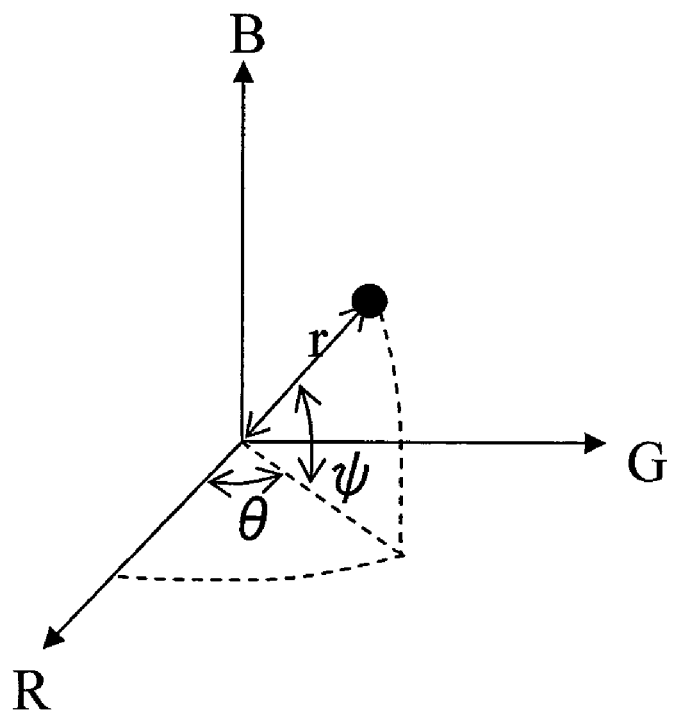
FIG. 39 shows an exemplary correspondence between an RGB color space and a spherical coordinate system ($\theta$, $\psi$, r).

FIG. 39 shows an exemplary correspondence between the RGB color space and the spherical coordinate system ($\theta$, $\psi$, r).

In FIG. 39, the direction in which $\theta$=0 is supposed to be positive R-axis direction in the RGB color space and the direction in which $\psi$=0 is supposed to be positive G-axis direction in the RGB color space as an example. However, the reference direction of the argument does not have to be defined as shown in FIG. 39 but may also be any other direction as well. Following such correspondence, the red, green and blue pixel values as the respective coordinates of the RGB color space are transformed into the coordinates of the spherical coordinate system ($\theta$, $\psi$, r) on a pixel-by-pixel basis.

In a situation where the pixel value of each pixel on the target image is defined by a three-dimensional vector in the RGB color space, if the three-dimensional vector is represented by the spherical coordinate system ($\theta$, $\psi$, r) associated with the RGB color space, then the brightness of a pixel (which is synonymous with the signal intensity or luminance) corresponds to the r coordinate representing the magnitude of the vector. On the other hand, the direction of the vector representing the color of a pixel (i.e., color information including hue, color difference and chroma) is defined by the $\theta$ and $\psi$ coordinates. That is why by using the spherical coordinate system ($\theta$, $\psi$, r), the three parameters r, $\theta$ and $\psi$ that define the brightness and color of a pixel can be treated independently of each other.

Equation (34) defines the sum of the squares of the second-order differences in the xy space directions between the pixel values of the target picture represented by the spherical coordinate system. And Equation (34) defines a condition $Q_{s1}$ that the more uniformly the pixel values of spatially adjacent pixels represented by the spherical coordinate system vary, the smaller its value. In this case, if the pixel values vary uniformly, then it means that the colors of those pixels are continuous with each other. That is to say, if the condition $Q_{s1}$ should have a small value, then the colors of spatially adjacent pixels within the target picture should be continuous with each other.

In a picture, a variation in the brightness of a pixel and a variation in the color of a pixel could be caused by physically different events. That is why by specifying a condition on the continuity of the brightness of a pixel (i.e., the uniformity of the variation in r coordinate) as represented by the third term in the braces in Equation (34) and a condition on the continuity of the color of a pixel (i.e., the uniformity of the variations in $\theta$ and $\psi$ coordinates) as represented by the first and second terms in the braces in Equation (34) independently of each other, the desired image quality can be achieved more easily.

$\lambda\theta$ (x, y), $\lambda\psi$ (x, y) and $\lambda_r$ (x, y) represent the weights applied at the pixel location (x, y) of the target picture to the conditions that are specified with the $\theta$, $\psi$ and r coordinates, respectively. These values need to be determined in advance. For example, simple settings such as $\lambda\theta$ (x, y)=$\lambda\psi$, (x, y)=1.0, and $\lambda_r$ (x, y)=0.01 may be adopted irrespective of the pixel location or frame. Also, that weight is preferably defined to be a light value at such a location in a picture where the discontinuity of pixel values can be expected. Pixel values may be determined to be discontinuous if the difference or the absolute value of the second-order difference between the pixel values of adjacent pixels in a frame of the input picture is equal to or greater than a certain value.

The weight applied to the condition on the continuity of the color of a pixel is preferably defined to be heavier than the one applied to the condition on the continuity of the brightness of the pixel. This is because due to the unevenness at the surface of the object and a change of the directions of the object's surface (i.e., the directions of the normal) with its motion, the brightness of a pixel in a picture varies more easily (i.e., varies less uniformly) than the color thereof.

In Equation (34), the sum of the squares of the second-order differences in the xy space directions between the pixel values of the target picture represented by the spherical coordinate system is defined to be the condition $Q_{s1}$. However, the sum of the absolute values of the second-order differences, the sum of the squares of the first-order differences, or simply the sum of the absolute values may also be defined as the condition.

Also, in the example described above, the color space conditions are set by the spherical coordinate system ($\theta$, $\psi$, r) that is associated with the RGB color space. However, the coordinate system to adopt does not have to be the spherical coordinate system. The conditions may also be set by a new orthogonal coordinate system with axes of coordinates that will separate the brightness and color of a pixel from each other easily. Even so, the same effect can also be achieved.

For example, the direction of an eigenvector may be determined by performing a principal component analysis on the frequency distribution of pixel values that are included in either the incoming moving picture or any other reference moving picture within the RGB space. And an axis of coordinates for a new orthogonal coordinate system may be defined in that direction of the eigenvector thus determined (which is supposed to be an "eigenvector axis").

$$Q_{s2} = \sum_x \sum_y [ \qquad (35)$$

$$\lambda_{C1}(x, y) \cdot \{4 \cdot C_1(x, y) - C_1(x, y-1) - C_1(x, y+1) - C_1(x-1, y) - C_1(x+1, y)\}^2 +$$

$$\lambda_{C2}(x, y) \cdot$$

$$\{4 \cdot C_2(x, y) - C_2(x, y-1) - C_2(x, y+1) - C_2(x-1, y) - C_2(x+1, y)\}^2 + \lambda_{C3}(x,$$

$$y) \cdot \{4 \cdot C_3(x, y) - C_3(x, y-1) - C_3(x, y+1) - C_3(x-1, y) - C_3(x+1, y)\}^2]$$

In Equation (35), $C_1(x, y)$, $C_2(x, y)$ and $C_3(x, y)$ indicate a rotation transformation for transforming the coordinates in the RGB color space, which are the red, green and blue pixel values at a pixel location (x, y) in the target picture, into $C_1$, $C_2$ and $C_3$ coordinates of a new orthogonal coordinate system.

Equation (35) defines the sum of the squares of the second-order differences in the xy space directions between the pixel values of the target picture represented by the new orthogonal coordinate system. And Equation (35) defines a condition $Q_{s2}$ that the more uniformly the pixel values of spatially adjacent pixels represented by the new orthogonal coordinate system vary (i.e., the more continuous the pixel values are) in the respective frame images of the target picture, the smaller its value.

That is to say, if the condition $Q_{s2}$ should have a small value, then the colors of spatially adjacent pixels within the target picture should be continuous with each other.

$\lambda_{C1}(x, y)$, $\lambda_{C2}(x, y)$ and $IC_3(x, y)$ represent the weights applied at the pixel location (x, y) of the target picture to the conditions that are specified with the $C_1$, $C_2$ and $C_3$ coordinates, respectively. These values need to be determined in advance.

If the $C_1$, $C_2$ and $C_3$ axes are eigenvector axes, the values of the $\lambda_{C1}(x, y)$, $\lambda_{C2}(x, y)$ and $\lambda_{C3}(x, y)$ may be determined independently of each other along the respective eigenvector axes. In this manner, a preferred $\lambda$ value can be determined according to the value of variance that changes with the eigenvector axis. That is to say, in the non-principal-component direction, the variance and the sum of the squares of the second-order differences would both decrease, and therefore, the $\lambda$ value is increased. In the principal-component direction, on the other hand, the $\lambda$ value is decreased conversely.

Although the two different conditions $Q_{s1}$ and $Q_{s2}$ have been described, either $Q_{s1}$ or $Q_{s2}$ may be adopted as the condition $Q_s$.

For example, with the condition $Q_{s1}$ of Equation (34) adopted, by introducing the spherical coordinate system ($\theta$, $\psi$, r), the condition may be specified using the coordinates on the $\theta$ and $\psi$ axes, which represent color information, and the coordinate on the r axis, which represents the signal intensity, independently of each other. And when the condition is set, preferred weight parameters $\lambda$ can be applied to the color information and the signal intensity, respectively. As a result, an image of quality can be generated more easily.

If the condition $Q_{s2}$ represented by Equation (35) is adopted, on the other hand, the condition is set with the coordinates of a new orthogonal coordinate system, which is defined by performing a linear (rotation) transformation on the coordinates in the RGB color space. As a result, the computation can be simplified.

In addition, by using eigenvector axes as the axes of coordinates $C_1$, $C_2$ and $C_3$ of the new orthogonal coordinate system, the conditions can be set using the coordinates of the eigenvector axes that reflect a variation in color that will affect a greater number of pixels. As a result, compared to a situation where the condition is set by simply using the pixel values of red, green and blue components, the quality of the target picture will be eventually improved.

It should be noted that the estimation function J described above does not have to be used. Optionally, some of the terms of Equation (30) could be replaced with ones defined by similar equations or a new term representing a different condition may be added, too.

Next, by obtaining respective pixel values of the target picture that will reduce significantly (and preferably minimize) the value of the estimation function J represented by Equation (30), the pictures $R_H$, $G_H$ and $B_H$ in respective colors that form the target picture are generated. Such a target picture g that will minimize the estimation function J may also be obtained by solving the following Equation (36) in which every time J is differentiated with the pixel value components of the pictures $R_H$, $G_H$ and $B_H$ in respective colors of the target picture, the result is always equal to zero. Optionally, those pictures could also be obtained by an optimization technique of an iterative computation type such as the steepest descent method.

$$\frac{\partial J}{\partial R_H(x, y)} = \frac{\partial J}{\partial G_H(x, y)} = \frac{\partial J}{\partial B_H(x, y)} = 0 \tag{36}$$

System Operation

Figure 20:
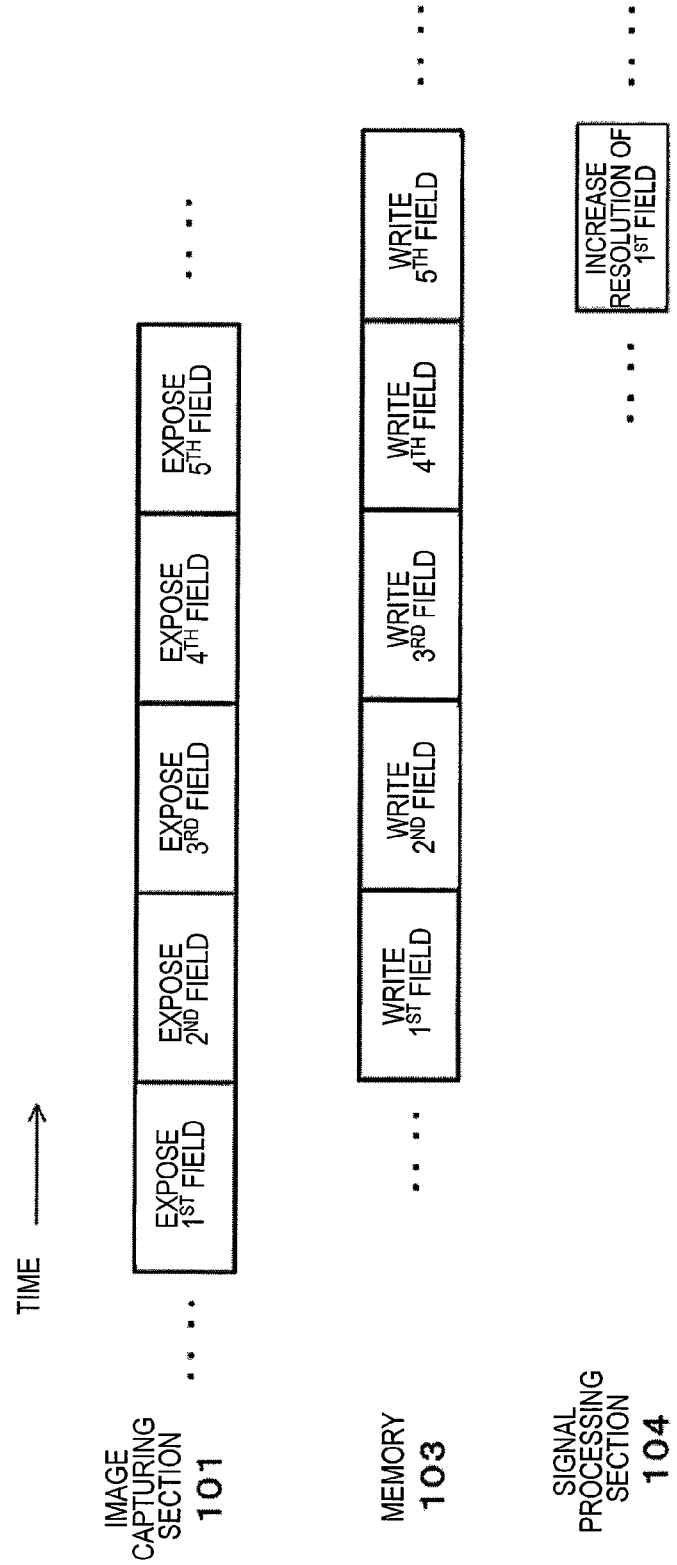
FIG. 20 shows exemplary timings of operation of the image capture device shown in FIG. 2.

FIG. 20 shows exemplary timings of operation of the image capture device of this preferred embodiment.

As shown in FIG. 20, field images, which have been exposed to radiation and captured by the image capturing section 101, are sequentially written on the memory 103 one after another. The signal processing section 104 performs the temporal and spatial resolution increasing processing when a field and the field images that precede and succeed that field are written. By performing such an operation, a high-resolution picture can be generated on a field-by-field basis.

Alternatively, the signal processing section 104 may perform the temporal and spatial resolution increasing processing every several (or n1) fields so that high-resolution pictures are generated at a time for n1 fields. Still alternatively, after the entire multi-interlaced picture has been once stored, the signal processing section 104 may perform the temporal and spatial resolution increasing processing on all fields, thereby generating high-resolution pictures for all of those fields. In that case, however, the required memory capacity should be big enough to store the entire multi-interlaced picture.

Optionally, the high-spatial-resolution images may be generated for only particular fields. Also, according to the display performance of the monitor, the temporal and spatial resolutions could be changed appropriately or just a portion of an image with the high temporal and spatial resolutions could be presented. That is to say, in the original image of this preferred embodiment, the resolution of one frame may fall within a wide range from a number of pixels of barely CIF or NTSC grade to a huge number of pixels of an HDTV or even higher grade such as 4 k×2 k (i.e., 4,000 horizontal pixels by 2,000 vertical pixels) or 8 k×4 k (i.e., 8,000 horizontal pixels by 4,000 vertical pixels).

The original image has one field period of approximately one-sixtieth or one-thirtieth second. On the other hand, as the output image, a frame image, of which the resolution also falls within a wide range from a number of pixels of barely CIF or NTSC grade to a huge number of pixels such as 4 k×2 k or 8 k×4 k just like the original image, can be generated as a moving picture at a rate of either 30 frames per second or 60 frames per second. Furthermore, it is naturally possible to make the output image a 1 to 2 field image depending on the type of the monitor.

As described above, according to this preferred embodiment, by receiving the multi-interlaced G picture and the all pixel read R and B pictures and performing the temporal and spatial resolution increasing processing on the multi-interlaced G picture by reference to the motion information that has been extracted from the R and B pictures, a moving picture with even higher temporal and spatial resolutions can be generated.

By reading pixels at roughly regular intervals both temporally and spatially from the multi-interlaced G picture, the precision of the high-resolution picture thus generated can be further increased. This is because when the temporal and spatial resolution increasing processing is carried out, the temporal and spatial intervals between a pixel that determines the pixel value and reference pixels for use to make computation (i.e., pixels that have been read actually) decrease equally.

Embodiment 2

Hereinafter, a second preferred embodiment of a multicolor image processor according to the present invention will be described.

In the device of the first preferred embodiment described above, the arrangement of pixels in the image capturing section 101 is accessed on a line-by-line basis, and such access can be made by both CCD imagers and CMOS imagers. On the other hand, in this preferred embodiment, the arrangement of pixels is accessed on a pixel-by-pixel basis, not on a line-by-line basis. Such an image capturing method can be carried out easily using randomly-accessible imagers such as CMOS imagers.

Figure 5:
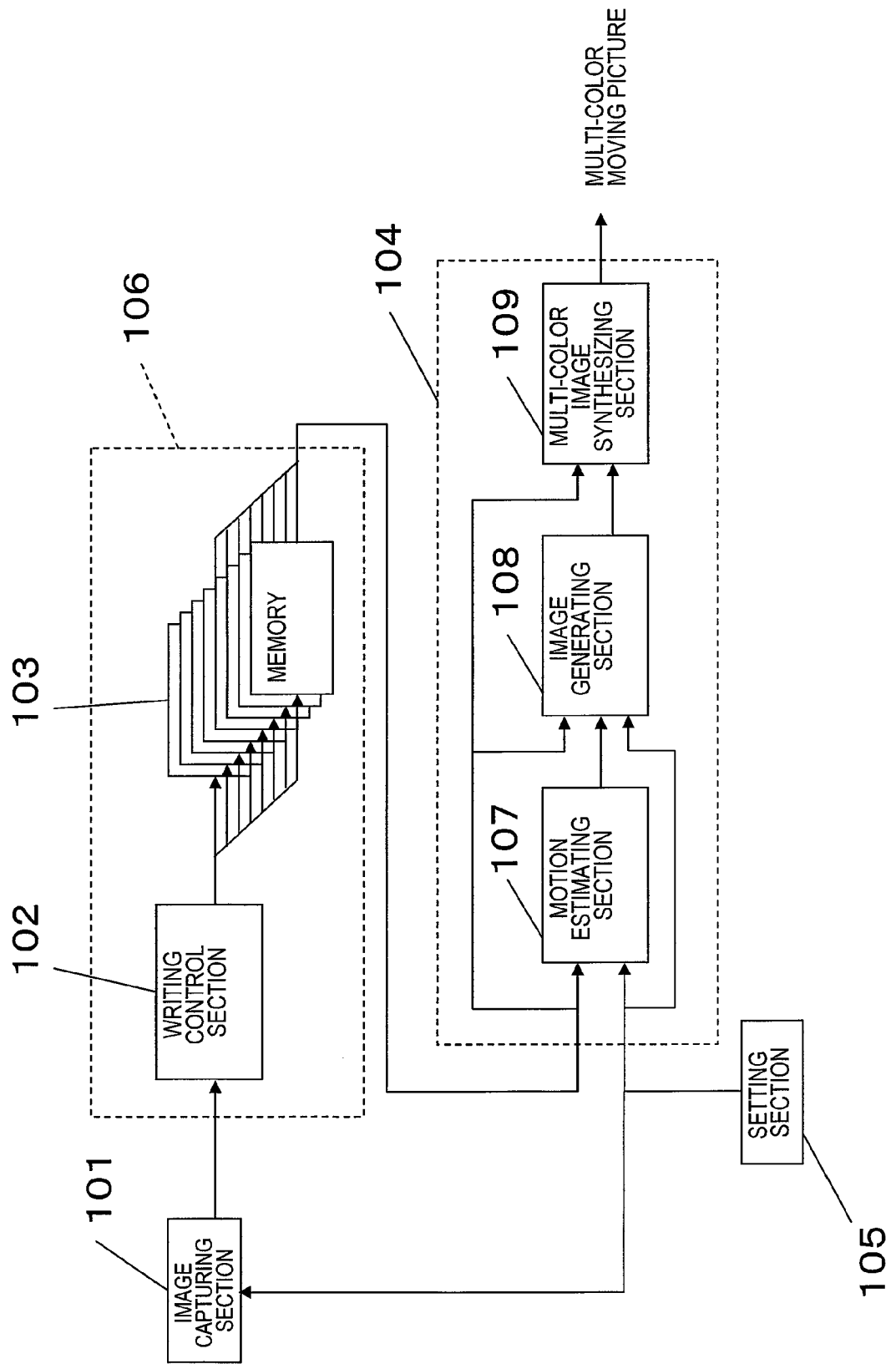
FIG. 5 is a block diagram of a multi-color image processor as the first preferred embodiment of the present invention.

The configuration of the processor of this preferred embodiment is basically the same as the one illustrated in FIG. 5. But the imagers of the image capturing section 101 of this preferred embodiment operate differently from their counterparts of the first preferred embodiment. Thus, the following description of the second preferred embodiment will be focused on only that difference from the first preferred embodiment.

Figure 21:
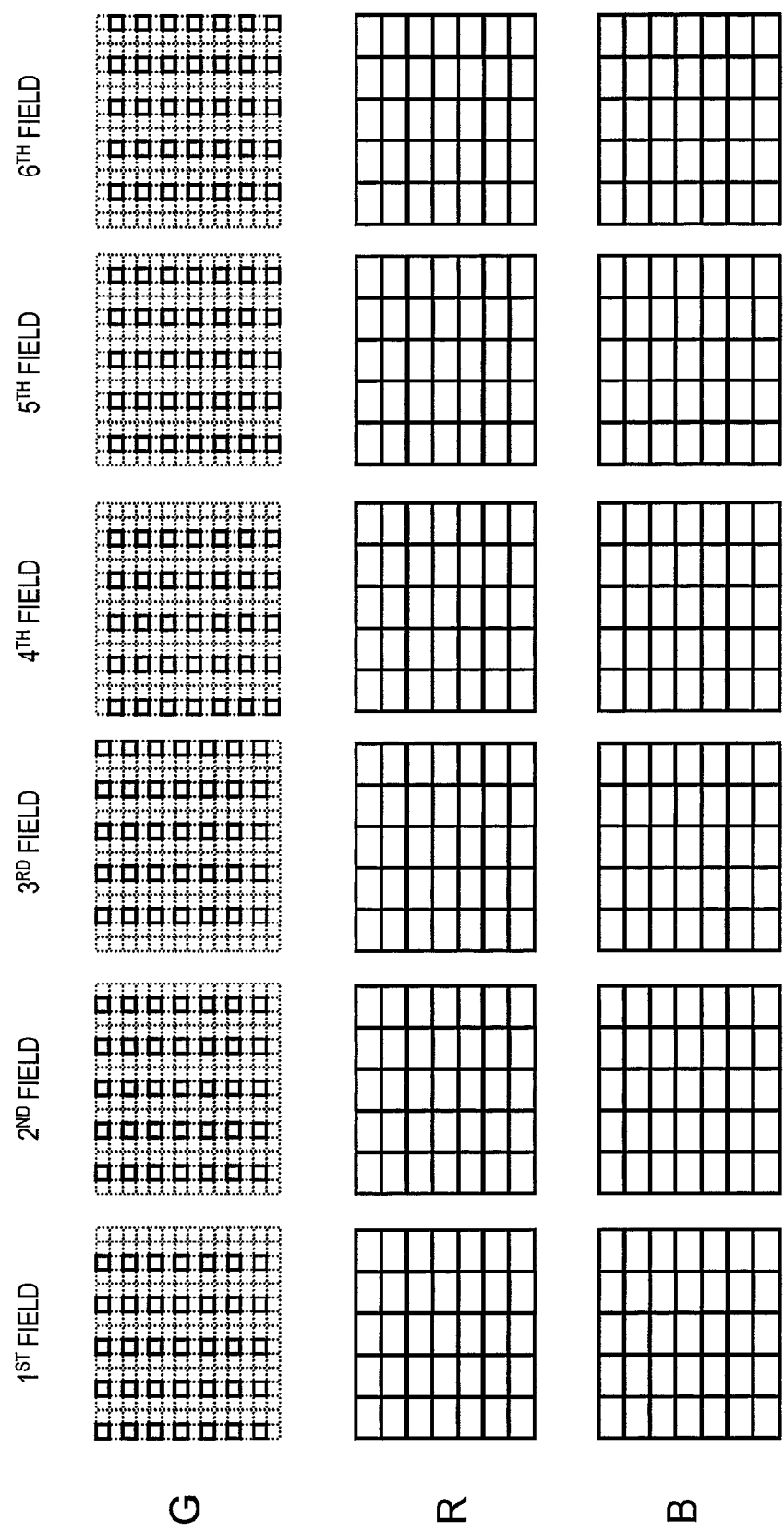
FIG. 21 schematically illustrates how the image capturing section 101 operates in a modified example of the first preferred embodiment of the present invention.
Figure 22:
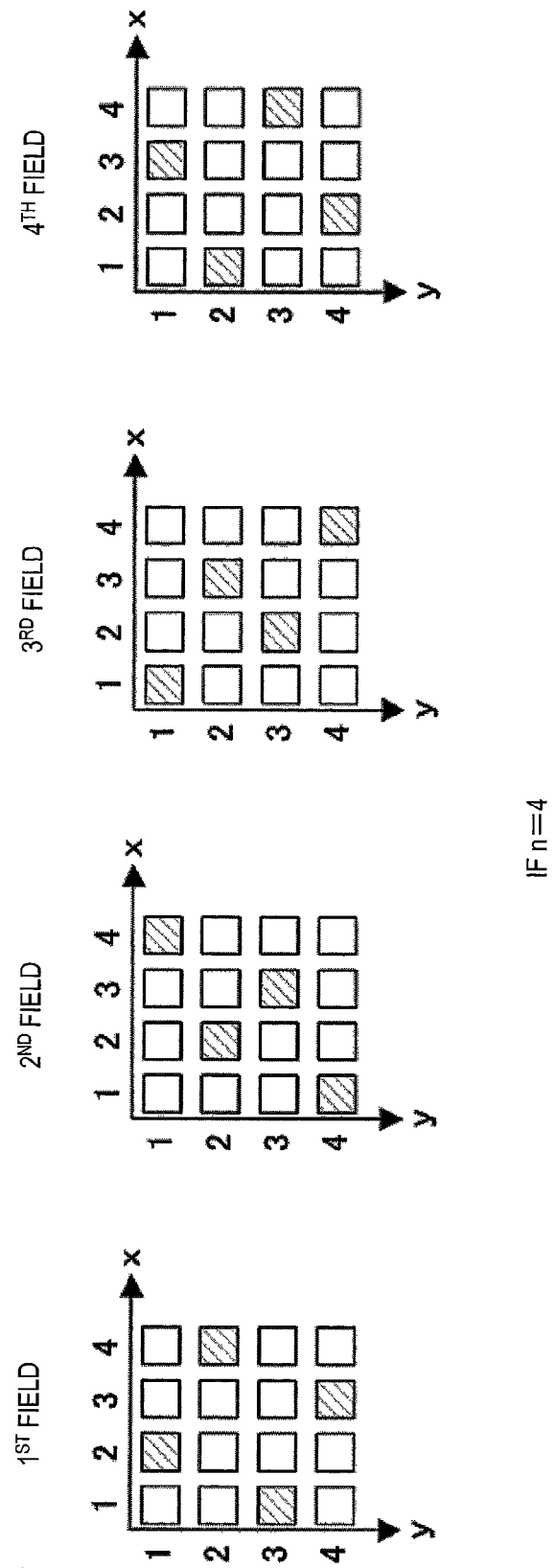
FIG. 22 illustrates an exemplary arrangement of pixels to read in respective fields in a situation where n=4.
Figure 23:
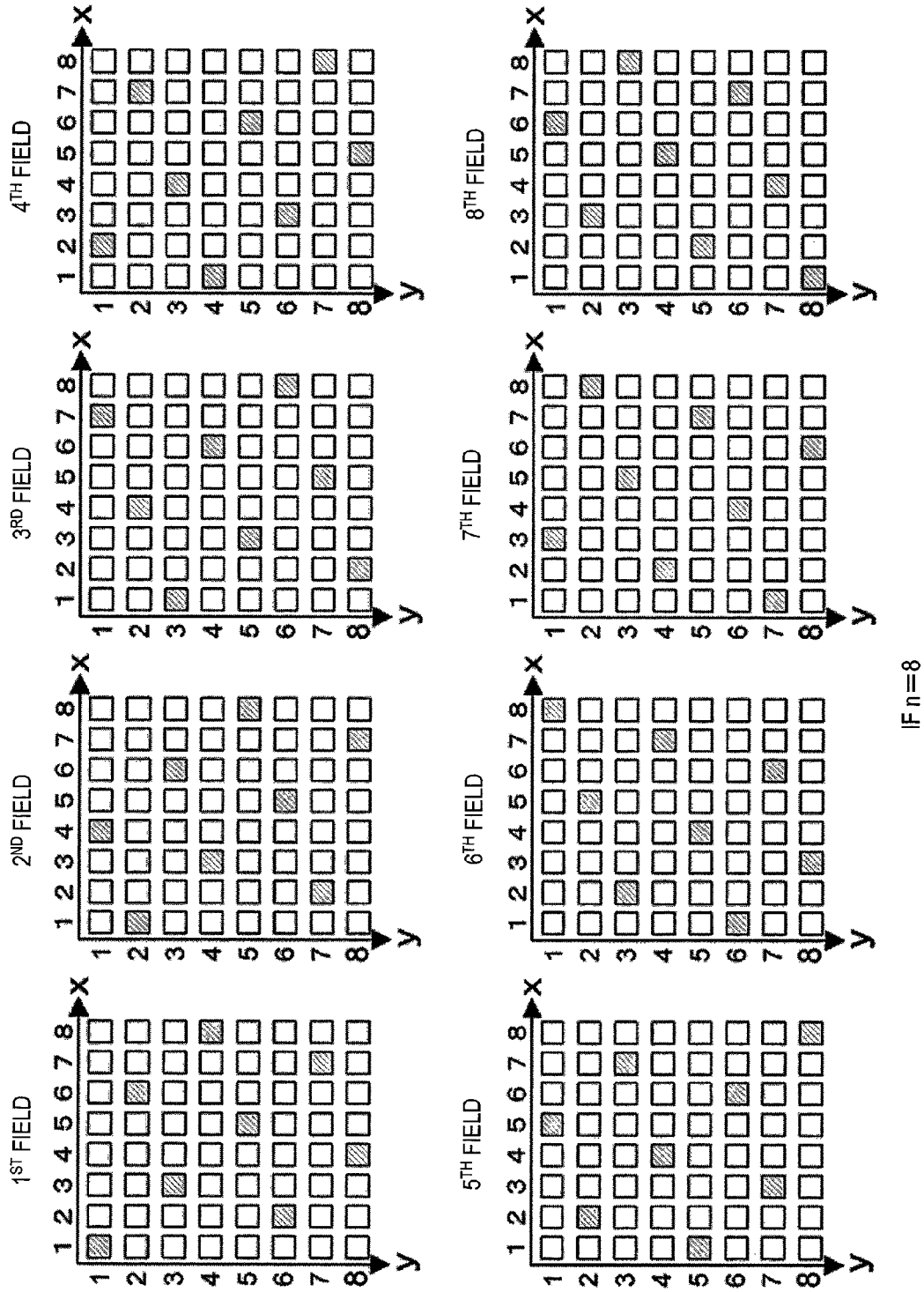
FIG. 23 illustrates an exemplary arrangement of pixels to read in respective fields in a situation where n=8.
Figure 24:
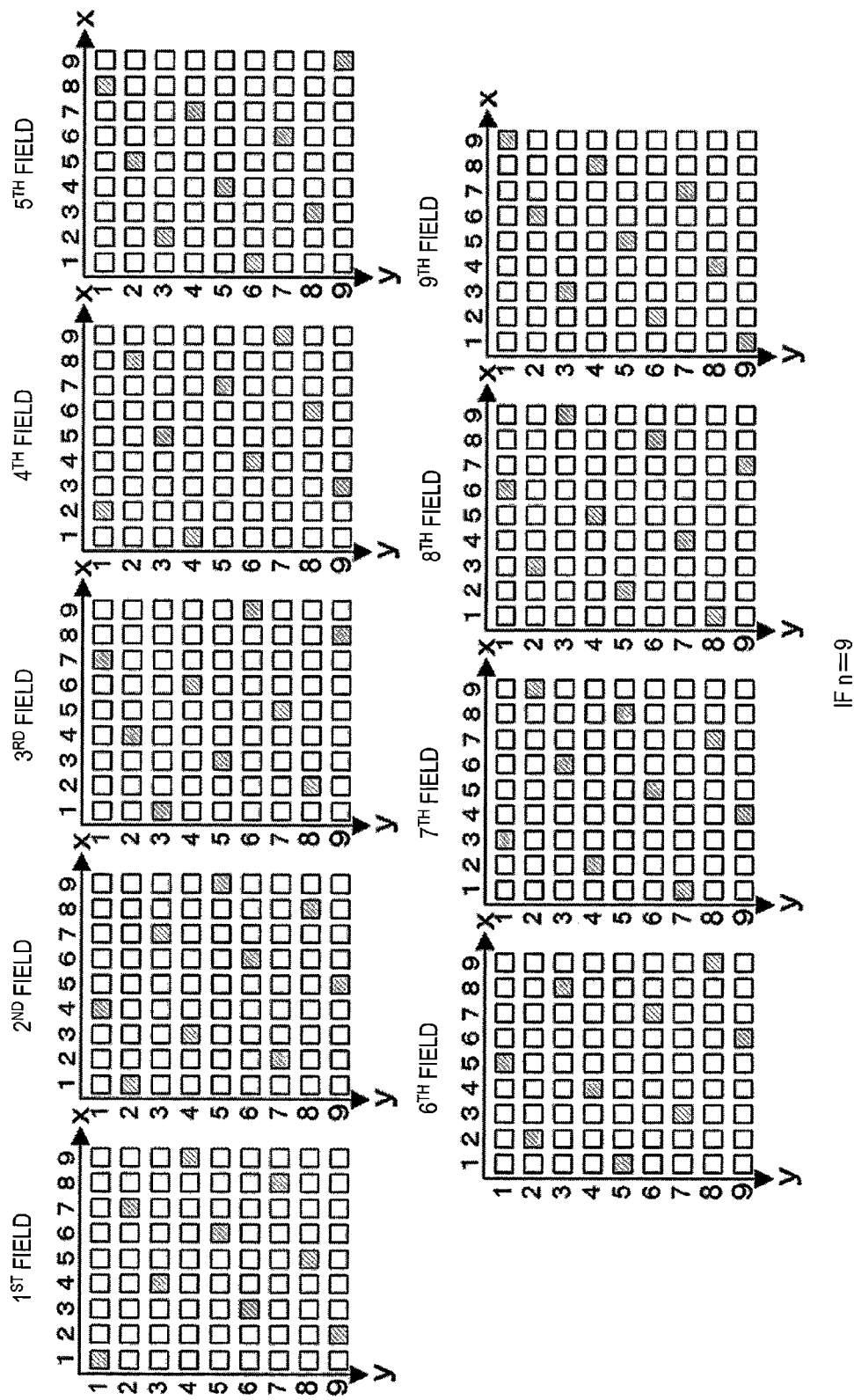
FIG. 24 illustrates an exemplary arrangement of pixels to read in respective fields in a situation where n=9.
Figure 25:
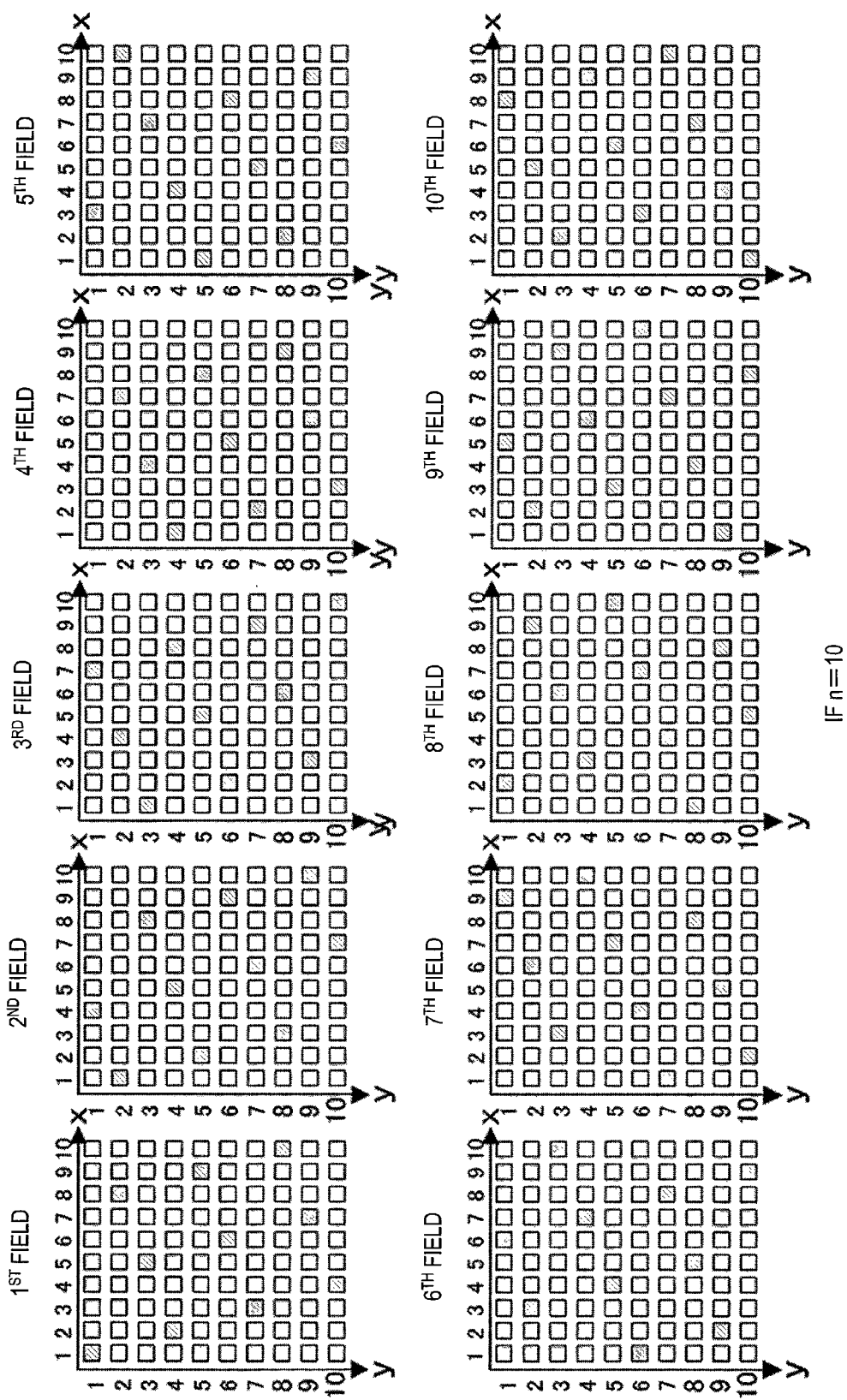
FIG. 25 illustrates an exemplary arrangement of pixels to read in respective fields in a situation where n=10.

First of all, look at FIG. 21, which is a drawing corresponding to FIG. 3 and schematically illustrates how the image capturing section of this preferred embodiment operates.

In this preferred embodiment, as for the G component of the original image, a number of pixels that form one frame are read as n (where n is an integer that is equal to or greater than three) fields with mutually different read pixel locations as shown in FIG. 21.

FIGS. 22 to 25 illustrate exemplary arrangements of pixels to read in this modified example, and show situations where n=4, 8, 9 and 10, respectively. Each of these drawings shows the locations of pixels to be read on the xy plane of the images in a series of n fields, and the shadowed squares indicate the pixels to be actually read. The arrangement of pixels to read in the xyt space can also be determined by making similar calculations to the method of determining the arrangement in the order of reading lines as already described for the first preferred embodiment.

Each of FIGS. 22 to 25 illustrates only n fields of (n×n) pixels. When the pixels are actually read, however, the illustrated pattern may be spatially expanded on the xy plane and used repeatedly with time. Naturally, the n value does not have to be 4, 8, 9 or 10 but may also be any other value.

The reading method of the first preferred embodiment may be regarded as a method for performing sampling densely in the x direction but on a different combination of lines one field after another in the y direction. On the other hand, according to the reading method of this preferred embodiment, the locations of samples in the xyt space can be made more uniform. As a result, the signal processing section 104 can get the temporal and spatial resolution increasing processing done even more effectively.

As can be seen, such a method for reading pixels with their decimation patterns changed on a field-by-field basis on the arrangement of pixels of the imagers while a moving picture for a first-color component is being obtained does not have be performed on a line basis as in the multi-interlaced reading method described above but may be done on a pixel basis as in this preferred embodiment. It depends on the pattern and motion of the object included in the scene which of these two reading methods is more appropriate. For example, if the object has a lot of horizontal stripes, the reading method of this second preferred embodiment is preferred to that of the first preferred embodiment. In this manner, the pixel decimation patterns could be changed according to the type of the scene. The decimation patterns may be changed either according to the mode that the user has selected in advance from a number of scene modes or according to the type of the moving picture actually captured.

Embodiment 3

In the first and second preferred embodiments described above, the exposure process time during the image capturing operation is roughly at most as long as one field period. However, this is just an example and the exposure process time of the G component image could be extended to n times as long as one field period (where n is the number of fields to read all pixels).

If the exposure process time of the G component image is defined to be longer than one field period, then the sampling process represented by Equations (3) to (5) should be changed partially. However, the light that would otherwise be wasted during the field periods other than the one for actually reading pixels can be used effectively according to this method.

Hereinafter, it will be described using a simple example how to formulate the sampling process H. If a picture made up of two frames (i.e., t=1, 2), each consisting of two horizontal pixels (i.e., x=1, 2) by two vertical pixels (i.e., y=1, 2), is sampled by 1 to 2 (i.e., n=2) interlacing.

If a picture consisting of two horizontal pixels (i.e., x=1, 2) by two vertical pixels (i.e., y=1, 2), is sampled by 1 to 2 (i.e., n=2) interlacing, then $$f = (I_{110}\ I_{210}\ I_{120}\ I_{220}\ I_{111}\ I_{211}\ I_{121}\ I_{221}\ I_{112}\ I_{212}\ I_{122}\ I_{222})^T \quad (37)$$

$$H = \begin{pmatrix} 1 & 0 & 0 & 0 & 1 & 0 & 0 & 0 & 0 & 0 & 0 & 0 \\ 0 & 1 & 0 & 0 & 0 & 1 & 0 & 0 & 0 & 0 & 0 & 0 \\ 0 & 0 & 0 & 0 & 0 & 0 & 1 & 0 & 0 & 0 & 1 & 0 \\ 0 & 0 & 0 & 0 & 0 & 0 & 0 & 1 & 0 & 0 & 0 & 1 \end{pmatrix} \quad (38)$$

and therefore, the sampling process is formulated as:

$$g = Hf = \begin{pmatrix} 1 & 0 & 0 & 0 & 1 & 0 & 0 & 0 & 0 & 0 & 0 & 0 \\ 0 & 1 & 0 & 0 & 0 & 1 & 0 & 0 & 0 & 0 & 0 & 0 \\ 0 & 0 & 0 & 0 & 0 & 0 & 1 & 0 & 0 & 0 & 1 & 0 \\ 0 & 0 & 0 & 0 & 0 & 0 & 0 & 1 & 0 & 0 & 0 & 1 \end{pmatrix} \quad (39)$$

$$(I_{110}\ I_{210}\ I_{120}\ I_{220}\ I_{111}\ I_{211}\ I_{121}\ I_{221}\ I_{112}\ I_{212}\ I_{122}\ I_{222})^T$$

$$= (I_{110} + I_{111}\ \ I_{210} + I_{211}\ \ I_{122} + I_{122}\ \ I_{221} + I_{222})^T$$

In Equation (39), I represents the G value of each pixel and the three subscripts attached to I represent the x, y and t values in this order. As g is a picture that has been generated by 1 to n interlacing, its number of pixels is n times as small as that of the all pixel read picture.

Embodiment 4

Hereinafter, a fourth preferred embodiment of a multi-color image processor according to the present invention will be described.

The difference between the multi-color image processor of the first preferred embodiment described above and the counterpart of this preferred embodiment lies basically in the configuration of the image capturing section 101. That is why the following description will be focused on the configuration and operation of the image capturing section 101.

Figure 26:
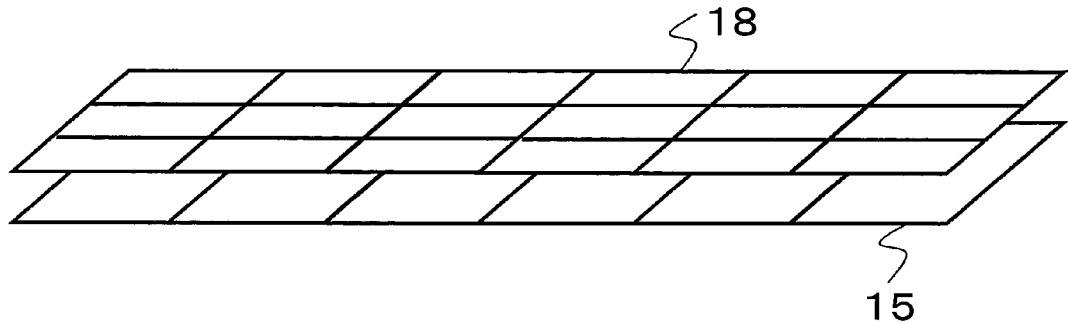
FIG. 26 illustrates an exemplary configuration for an image capturing section according to the first preferred embodiment of the present invention.

As shown in FIG. 26, in the image capturing section 101 of this preferred embodiment, a liquid crystal transmission plate 18 is arranged in front of the G imager 15, thereby setting the exposure process time of G to be equal to or shorter than one field period. In FIG. 26, only six pixels that are horizontally arranged in line are shown among a huge number of pixels of the G imager 15 and only a portion of the liquid crystal transmission plate 18 associated with those six pixels is illustrated for the sake of simplicity.

The liquid crystal transmission plate 18 functions as a spatial light modulator that selectively transmits or cuts off incoming light on a pixel basis. Specifically, the liquid crystal transmission plate 18 has a structure in which a liquid crystal layer is sandwiched between two transparent substrates that have transparent electrodes for applying a voltage to only a portion of the liquid crystal layer on a pixel basis. By applying a voltage to just a portion of the liquid crystal layer that is associated with a selected pixel, the orientations of liquid crystal molecules can be controlled and the amount of light transmitted through the respective pixels can be adjusted.

In the liquid crystal transmission plate 18, n pixels (e.g., n=3 in the example illustrated in FIG. 26) face one pixel of the G imager 15 and the vertical pixel pitch of the liquid crystal transmission plate 18 is n times as small as that of the imager 15.

Figure 27:
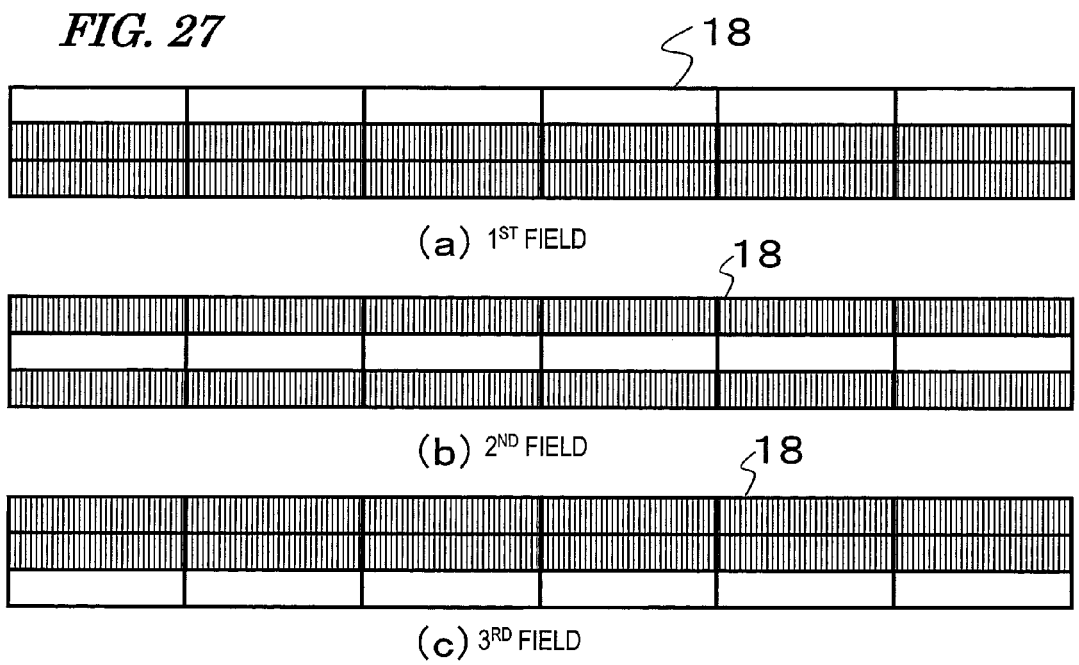
FIG. 27 shows how the image capturing section may operate in the first preferred embodiment of the present invention.

Since the processor of this preferred embodiment includes such an image capturing section, the lines to transmit light can be changed on a field-by-field basis on the liquid crystal transmission plate 18 as shown in FIG. 27. Specifically, FIGS. 27(a), 27(b) and 27(c) illustrate the light transmitting states of the liquid crystal transmission plate 18 at mutually different points in time. In FIG. 27, the shadowed pixels are OFF state pixels that cut off the incoming light, while the open pixels are ON state pixels that transmit the incoming light.

In the state shown in FIG. 27(a), only the pixels at the top of the three rows of pixels of the liquid crystal transmission plate 18 transmit the incoming light. In the states shown in FIGS. 27(b) and 27(c), on the other hand, the incoming light is transmitted by only the pixels on the middle row and the pixels on the bottom row, respectively.

By controlling the ON and OFF (i.e., light transmitting and cutoff) states of the liquid crystal layer on a line-by-line basis in this manner, even a single row of pixels of the G imager 15 can function as three rows of pixels. That is to say, there is no need to make the pixel size of the G imager 15 smaller than that of the R and B imagers. As a result, imagers with the same degree of integration can be used for all of R, G and B, thus increasing the cost-effectiveness.

In the example illustrated in FIGS. 26 and 27, n=3, and therefore, the resolution can be tripled vertically compared to the one to be achieved with the actual pixel pitch. If the n value is set to be four or more, then the resolution can be further increased.

Figure 28:
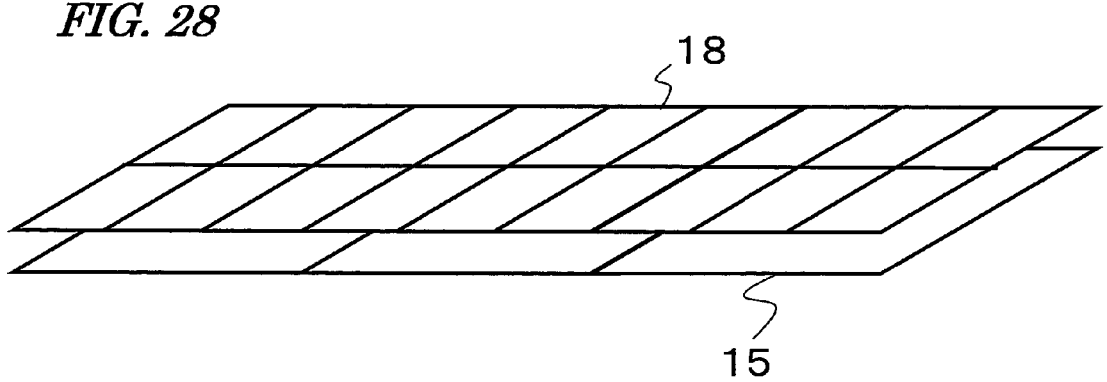
FIG. 28 shows the concept of an exemplary configuration for an image capturing section as a modified example of the first preferred embodiment of the present invention.
Figure 29:
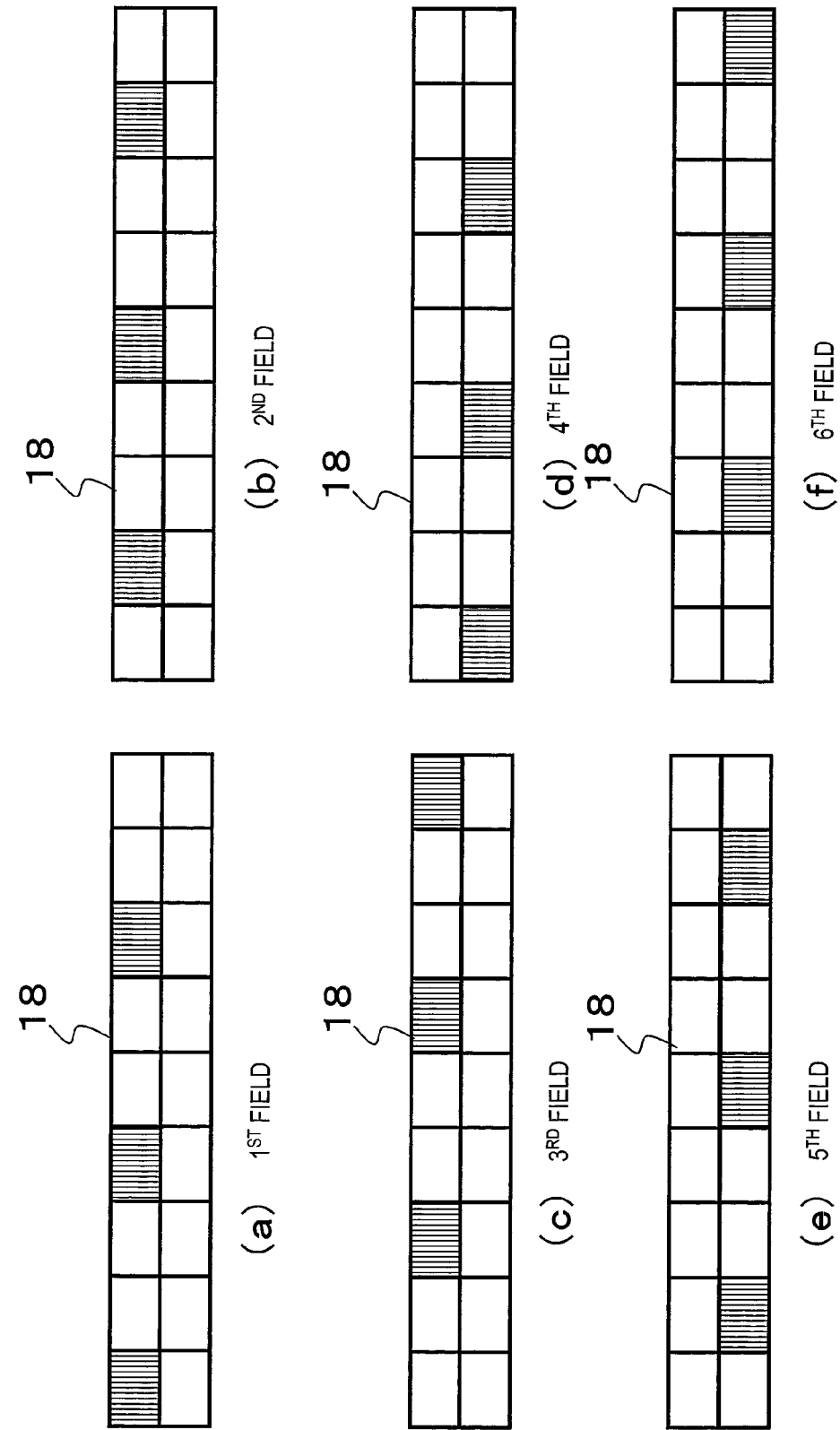
FIGS. 29(a) to 29(f) show the concept of how the image capturing section may operate in the modified example of the first preferred embodiment of the present invention.

Such a technique for increasing the resolution of an imager effectively using a liquid crystal transmission plate is also applicable to the image capturing section of the second preferred embodiment. If the liquid crystal transmission plate 18 is applied to the second preferred embodiment, a liquid crystal transmission plate 18, of which the vertical and horizontal pixel pitches are finer than that of the imager, may be arranged in front of the G imager 15 as shown in FIG. 28, and the pixels of the liquid crystal transmission plate 18 to transmit the incoming light may be changed on a field-by-field basis as shown in FIG. 29. In the example illustrated in FIG. 28, six pixels of the liquid crystal transmission plate 18 face one pixel of the G imager 15. By adopting such a configuration, six field images such as the first through sixth fields shown in FIGS. 29(a) through 29(f) can be obtained.

In the example illustrated in FIGS. 28 and 29, the horizontal and vertical pixel pitches of the liquid crystal transmission plate 18 are respectively set to be one-third and one half of those of the G imager 15, and therefore, the resolution can be increased sixfold compared to the one to be achieved with the actual pixel pitch. It should be noted that the pixel pitches of the liquid crystal transmission plate and the imager do not have to satisfy the relation described above.

Monochrome Output

The processor of each of the preferred embodiments of the present invention described above has a configuration for outputting a color picture as a result of image processing. However, the output image does not always have to be a color picture but could be a monochrome picture depending on the application. In that case, there is no need to perform the resolution increasing processing as for R and B but only the result of processing for G may be output as a monochrome picture.

Figure 30:
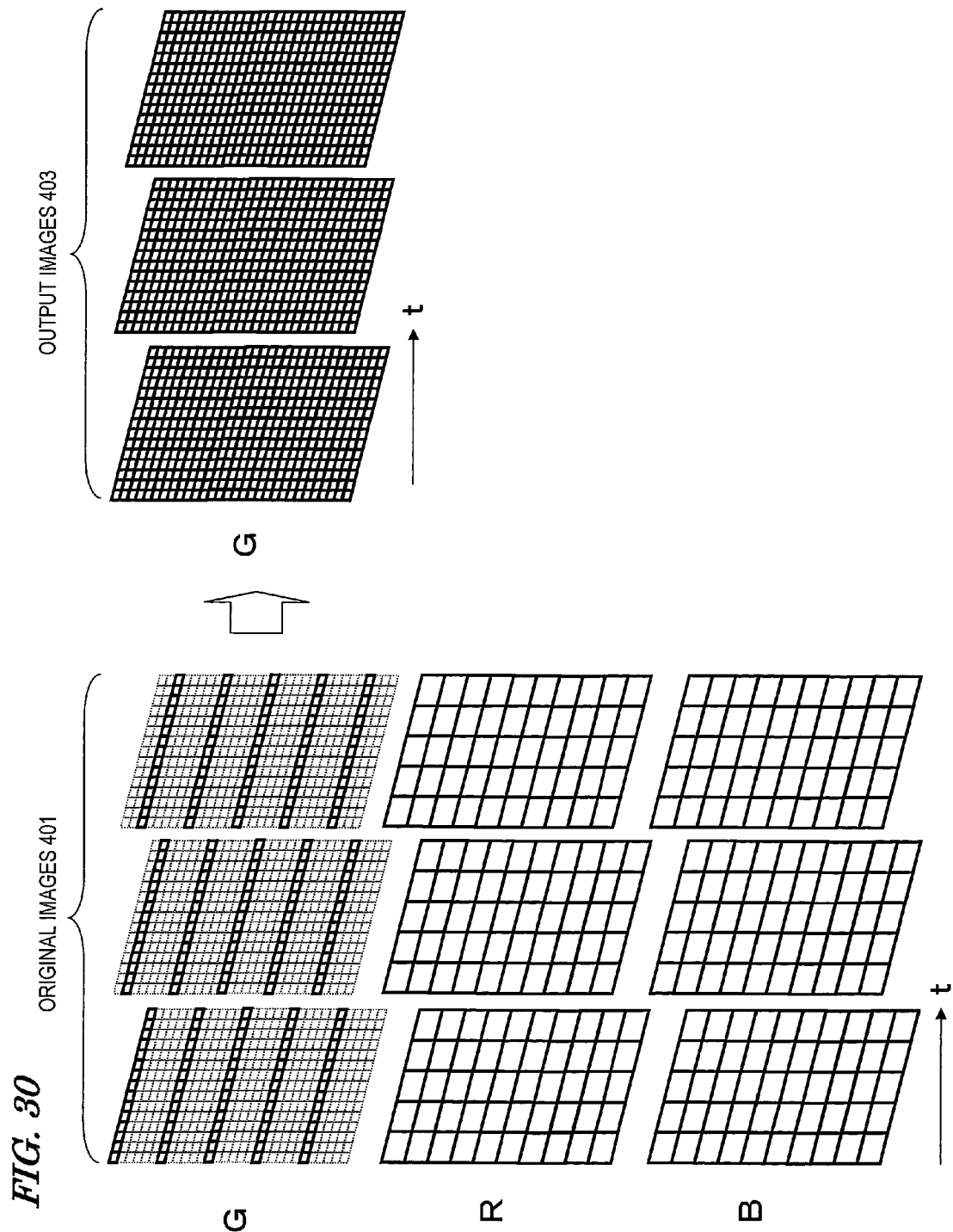
FIG. 30 shows the concept of how the image capturing section operates to output a monochrome picture.

FIG. 30 illustrates the concept of how the processor should operate to output a monochrome picture. If the output image is a monochrome picture in this manner, the inputs do not always have to be three channels but only images with first-color components, of which pixels should be read selectively with decimation, and images with second-color components, of which every pixel should be read at a low resolution, may be input.

In each of the preferred embodiments of the present invention described above, G pixels are supposed to be read selectively with decimation by a technique such as multi-interlaced reading, for example, while the R and B images are supposed to be captured with a low resolution, a short exposure process, and a high frame rate. However, reading with decimation does not always have to be carried out in such a wavelength range. Considering the visual sensitivity of a human being, normally such reading with decimation is preferably carried out, and the resolution is preferably increased, for the color G. However, if it is known in advance that the image to be captured would have a lot of B components (e.g., in a scene where the image should be captured under sea water or in a swimming pool), then B pixels may be read with decimation as well. In that case, by capturing R and G images with a low resolution, a short exposure process and a high frame rate and by getting the B resolution increased by the processing section, the viewer can be presented with an image with a high resolution.

Figure 31:
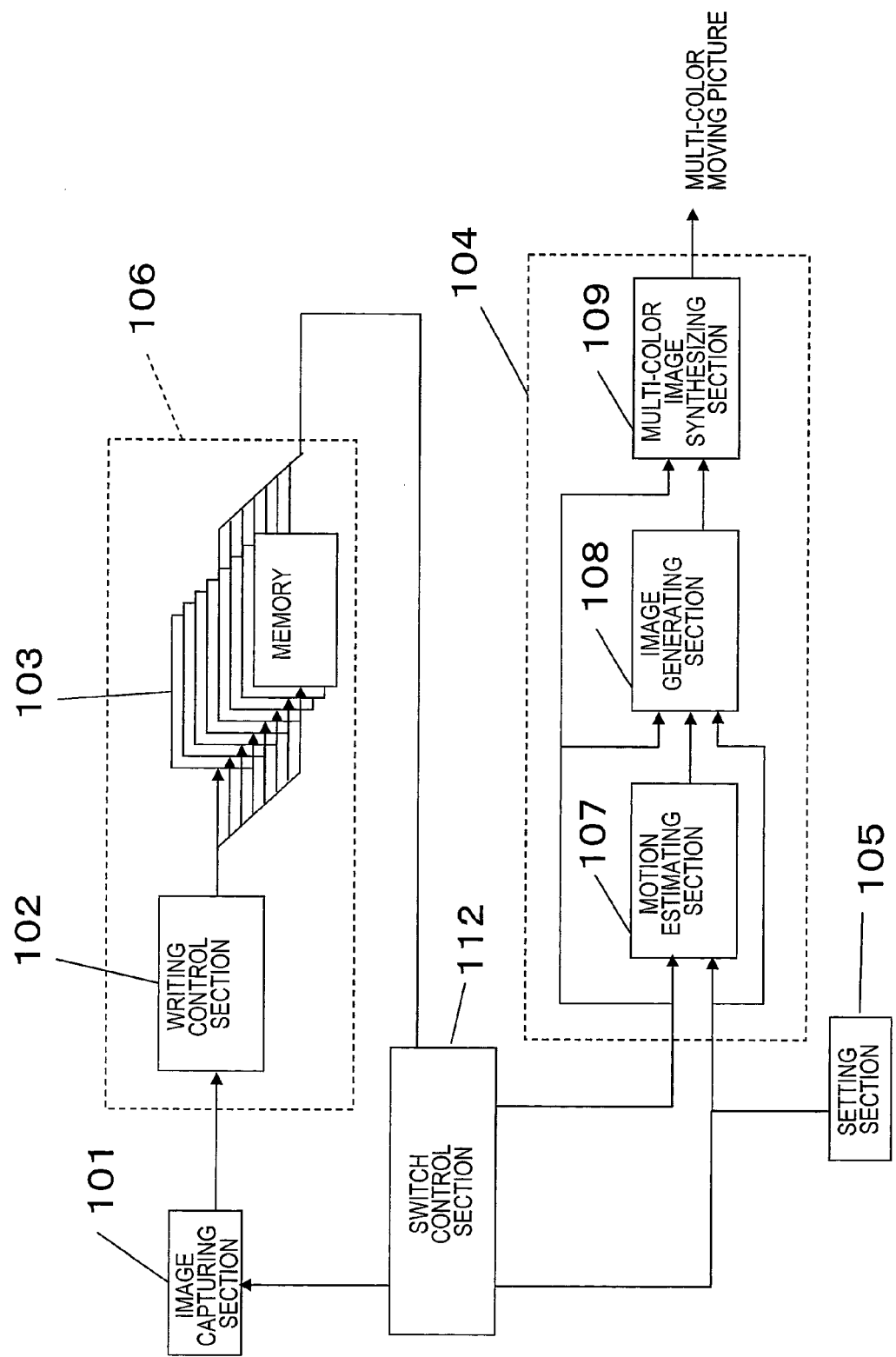
FIG. 31 illustrates an exemplary configuration for a multi-color image processor that detects the distribution of colors.

Optionally, the colors in which such a capturing operation should be performed with pixels decimated may be switched dynamically by sensing the distribution of color components in an actual scene. To get such switching done, a switching control section 112 may be provided between the image capturing section 106 and the signal processing section 104 as shown in FIG. 31, for example. And according to the distribution of color components in a scene, the image capturing section 106 needs to perform an image capturing operation such as multi-interlaced reading using one of the R, G and B imagers that is associated with the color component included most in that scene.

Image Processing Method

Hereinafter, a preferred embodiment of an image processing method according to the present invention will be described with reference to FIG. 32, which is a flowchart showing an image processing method according to this preferred embodiment.

Figure 32:
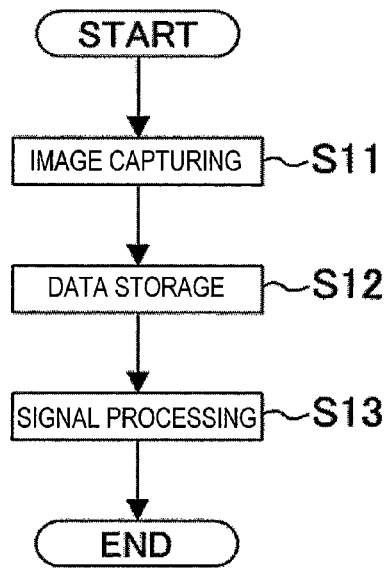
FIG. 32 is a flowchart showing an image processing method according to a preferred embodiment of the present invention.

As shown in FIG. 32, according to the image processing method of this preferred embodiment, first of all, an image capturing processing step S11 to capture original images is performed, and then a data storing processing step S12 to store the original images captured in a memory is performed. Thereafter, a signal processing step S13 to generate a high-resolution picture based on the original images stored is carried out.

Figure 33:
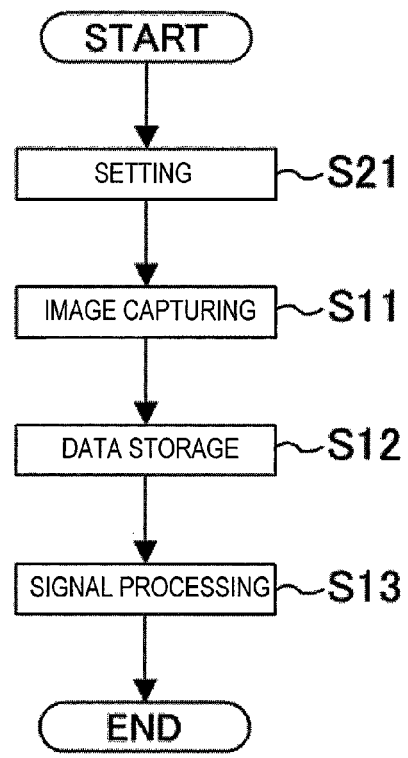
FIG. 33 is a flowchart showing another image processing method according to a preferred embodiment of the present invention.

The n value, which is the number of required fields for reading all pixels, may be fixed but may also be set before the capturing operation is started. FIG. 33 is a flowchart showing an image processing method in such a situation. In that case, a setting processing step S21 to set the n value needs to be carried out in advance before the respective processing steps S11 to S13 shown in FIG. 32 are started.

The signal processing step S13 shown in FIGS. 32 and 33 may be carried out by the signal processing section 104 shown in FIG. 2, for example. The motion estimating section 107, the image generating section 108 and the multi-color image synthesizing section 109 that are included in such a signal processing section 104 may be implemented as mutually different pieces of hardware but may also be implemented as a combination of hardware and software as well. In other words, the signal processing section 104 may be made up of image processors dedicated to the motion estimating section 107, the image generating section 108 and the multi-color image synthesizing section 109. Also, by operating a general-purpose computer or digital signal processor using a predetermined program, the computer or the processor may function as the motion estimating section 107, the image generating section 108 and the multi-color image synthesizing section 109.

A program according to the present invention is defined to operate a signal processor that outputs a multi-color moving picture based on multiple images with first-color components, of which one frame is comprised of n fields (where n is an integer that is equal to or greater than two), and multiple images, which have second-color components and of which one frame consists of one field. Specifically, the program is defined to make the signal processor perform the steps of: outputting, based on the images with the second-color components, motion information about a moving picture made up of those images with the second-color components; generating a synthetic image of the first-color components of respective fields based on the images with the first-color components and the motion information and outputting the image thus generated as a first synthetic image that has a higher spatial resolution than the images with the first-color components; and generating and outputting a multi-color moving picture with the first- and second-color components based on the first synthetic image and the images with the second-color components.

Part or all of such a program may not only be stored in a storage medium but also be transmitted or received by way of a wired or wireless transmission medium. This program can naturally be a program that has been pre-installed in a signal processor during the manufacturing stage thereof. But this program can also be installed in the signal processor afterward by way of a storage medium such as a memory card, the Internet or a digital broadcast.

A multi-color image processor according to the present invention includes an image capturing section and a signal processing section. However, the image capturing section and the signal processing section do not have to form a single integrated device in the same housing. But those two sections just need to be connected together so that one of the two sections can transmit and receive a signal to/from the other.

Figure 34:
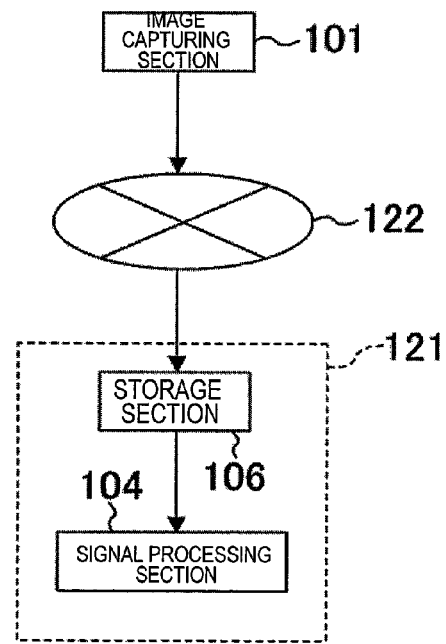
FIG. 34 illustrates an exemplary configuration for an image capturing system according to the present invention.

FIG. 34 illustrates an example in which the image capturing section 101 and the signal processing section 104, which are arranged at mutually different locations, form a single image processing system. In the example illustrated in FIG. 34, the image capturing section 101 and a server 121 are connected together with a network 122 such as the Internet or an intra net. The server 121 includes the storage section 106 and the signal processing section 104 shown in FIG. 5.

The original images captured by the image capturing section 101 are transmitted over the network 122 and stored in the storage section 106 of the server 121. The server 121 may be either a home server that is installed in the house of a user who owns the portable image capturing section 101 or a server owned by a person who provides image processing service for the user.

The data to be sent out from the image capturing section 101 over the network 122 includes not just original images but various other kinds of additional information that define a read pattern required for image processing. Examples of such additional information include information that identifies the type of the pixel reading pattern shown in FIG. 3 or 21 and information representing an n value.

Figure 35:
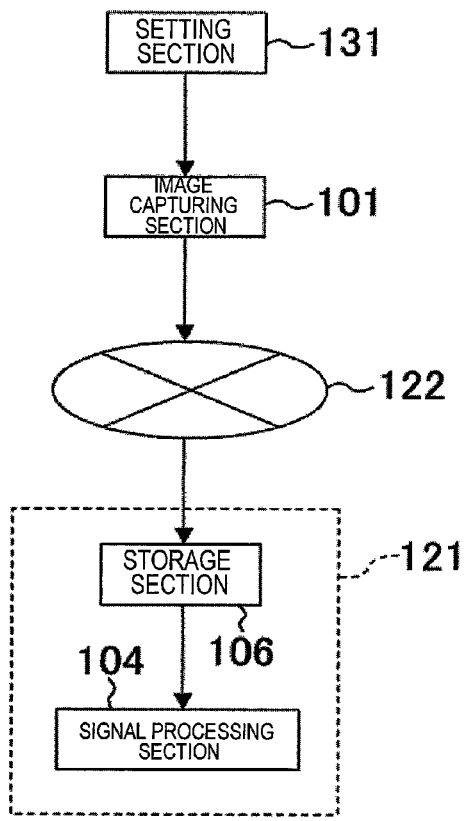
FIG. 35 illustrates an exemplary configuration for another image capturing system according to the present invention.
Figure 36:
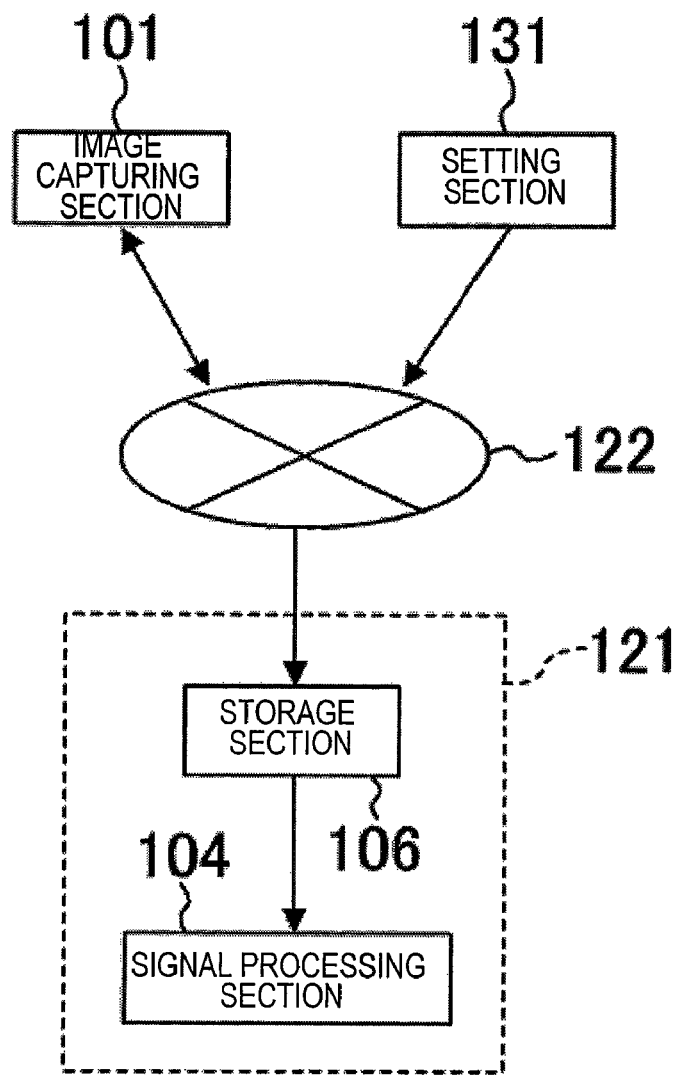
FIG. 36 illustrates an exemplary configuration for another image capturing system according to the present invention.
Figure 37:
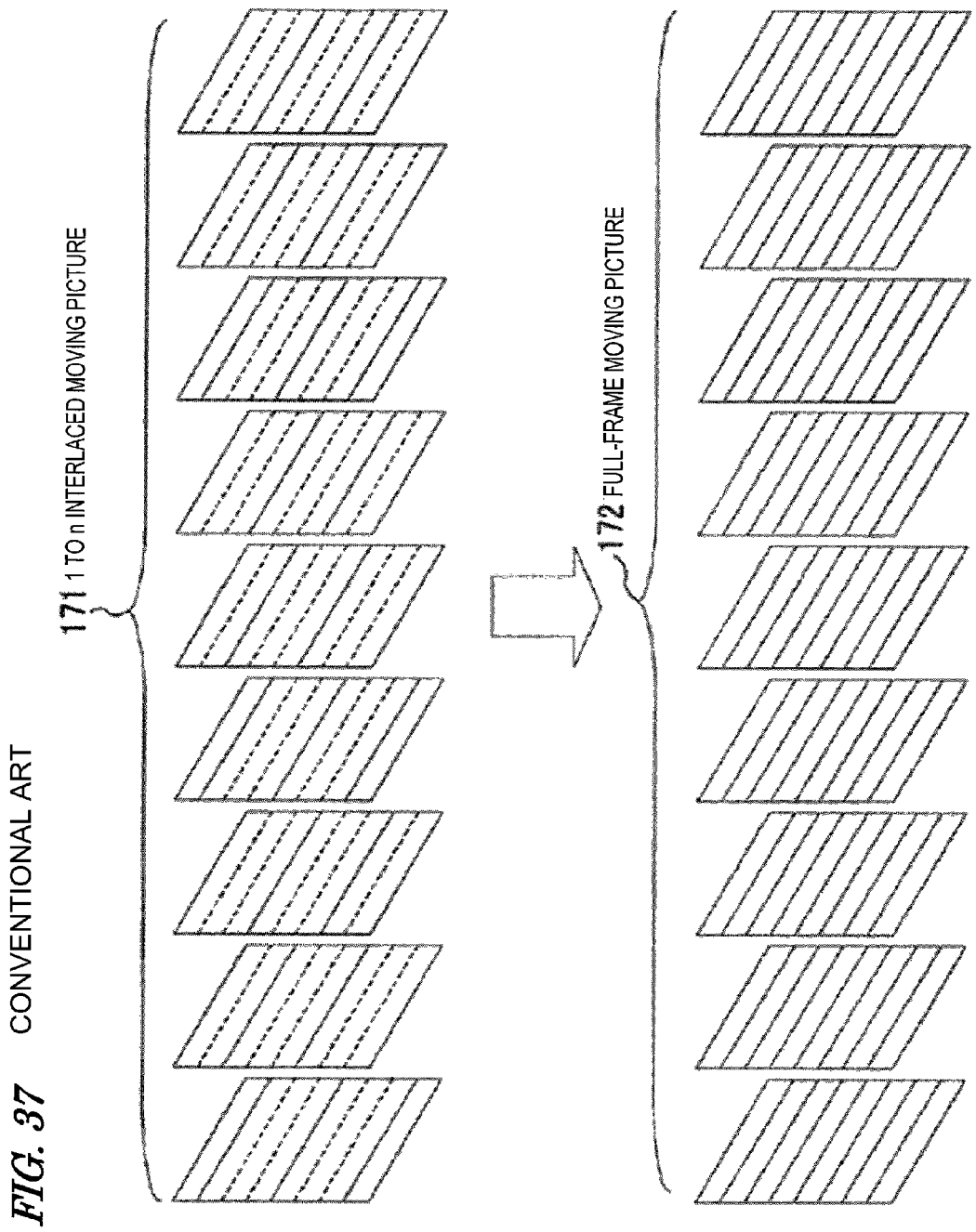
FIG. 37 shows the concept of how a conventional image capturing system operates.

FIG. 35 illustrates another exemplary configuration for an image processing system as an embodiment of a multi-color image processor according to the present invention. Unlike the system shown in FIG. 34, the system shown in FIG. 35 includes a setting section 131 for setting the n value. The setting section 131 may be provided physically separately from, but connected over the network 122 to, the image capturing section 101 as shown in FIG. 36. Such an image processing system can be used effectively in a situation where the image capturing section 131 is remote-controlled. For example, if an arbitrary object is selected with the position or angle of the image capturing section 131 remote-controlled, then not just the n value but also information required to control the image capturing section 131 remotely will be input to the setting section 131.

In the examples illustrated in FIGS. 34 to 36, the storage section 106 and the signal processing section 104 are arranged in the same server 121. Optionally, another storage section, having the same configuration as the storage section 106, may also be provided for the image capturing section 101. If such a storage section is directly connected to the image capturing section 101, not over the network 122, then the moving picture captured by the image capturing section 101 is once stored in that storage section (not shown) before being sent out toward the server 121 over the network 122.

As described above, an image processor according to the present invention can be used effectively to get a high-definition image captured by a camera with imagers of a smaller size and can also be used as a player or a system thereof. According to the present invention, by capturing a moving picture with first-color components, of which pixels for one frame have been read in multiple fields, and moving pictures with second- and third-color components, of which all pixels have been read with a low resolution, using imagers that make line-by-line access such as CCDs or randomly accessible imagers such as CMOS devices, a moving picture or a color moving picture, which is made up of first-color components, can be generated with the temporal and spatial resolutions increased. As a result, a moving picture with high temporal and spatial resolutions can be generated from either images that have been shot with a cellphone or a digital camera having a sequential shooting function or even video shot with a monitor camera.

INDUSTRIAL APPLICABILITY

A multi-color image processor, an image capture device, an image capturing method and a program according to the present invention can obtain a color moving picture with a high resolution using only imagers with a limited number of pixels, and therefore, can be used in camcorders and various other types of devices.

The invention claimed is:

1. A multi-color image processor comprising:
an image capturing section including a color separating section for separating visible radiation into a light ray with a first-color component and a light ray with a second-color component, which is different from the first-color component, and first and second imagers that receive the light ray with the first-color component and the light ray with the second-color component, respectively, wherein the image capturing section gets multiple images with the first-color components by making the first imager decimate pixels to read on a field-by-field basis on an arrangement of pixels of the first imager and also gets multiple images with the second-color components using the second imager on a field-by-field basis on an arrangement of pixels of the second imager;
a motion estimating section for estimating, based on the images with the second-color components, a motion in a moving picture made up of those images with the second-color components and outputting motion information;
an image generating section for generating a synthetic image of the first-color components of respective fields based on the images with the first-color components and the motion information and outputting the image thus generated as a first synthetic image that has a higher spatial resolution than the images with the first-color components; and
a multi-color image synthesizing section for generating and outputting a picture with the first- and second-color components based on the first synthetic image and the images with the second-color components.

2. The multi-color image processor of claim 1, wherein the image capturing section gets the images with the first-color components, of which one frame is comprised of n fields (where n is an integer that is equal to or greater than two), by changing the positions of pixels to read on the first imager one field after another.

3. The multi-color image processor of claim 2, wherein in accordance with the motion information, the image generating section defines the spatial resolution of the first synthetic image to be n times as high as that of the images with the first-color components.

4. The multi-color image processor of claim 3, wherein the spatial resolution of the first synthetic image is higher than that of the images with the second-color components.

5. The multi-color image processor of claim 4, wherein the image capturing section gets each said image with the second-color component by using at least one pixel, of which the size is bigger than each pixel of the first imager, as a minimum unit of pixels to read on the arrangement of pixels of the second imager.

6. The multi-color image processor of claim 3, wherein the images with the second-color components have a different spatial arrangement of pixels from the images with the third-color components.

7. The multi-color image processor of claim 1, comprising a resolution increasing section for generating and outputting a second synthetic image based on the first synthetic image and the images with the second-color components by increasing the resolution of the images with the second-color components by reference to information about the first synthetic image,
wherein the multi-color image synthesizing section generates and outputs a picture, including the first- and second-color components, based on the first and second synthetic images.

8. The multi-color image processor of claim 7, wherein the spatial resolution of the second synthetic image is as high as that of the first synthetic image.

9. The multi-color image processor of claim 1, wherein the pixels to read selected by the image capturing section on a field-by-field basis on the arrangement of pixels of the first imager have a first pattern in which multiple pixels, selected from the arrangement of pixels, are arranged in line.

10. The multi-color image processor of claim 1, wherein the pixels to read selected by the image capturing section on a field-by-field basis on the arrangement of pixels of the first imager have a second pattern in which multiple pixels, selected from the arrangement of pixels, are distributed discretely.

11. The multi-color image processor of claim 1, wherein the pixels to read selected by the image capturing section on a field-by-field basis on the arrangement of pixels of the first imager have their arrangement patterns changed between a first pattern in which multiple pixels, selected from the arrangement of pixels, are arranged in line and a second pattern in which multiple pixels, selected from the arrangement of pixels, are distributed discretely.

12. The multi-color image processor of claim 1, wherein the color separating section is designed to separate the visible radiation into not only the respective light rays with the first- and second-color components but also a light ray with a third-color component that is different from the first- and second-color components, and
wherein the image capturing section further includes a third imager that receives the light ray with the third-color component and gets multiple images with the third-color components on a field-by-field basis on the arrangement of pixels of the third imager, and
wherein the motion estimating section estimates, based on the images with the second-color components and third-color components, a motion in a moving picture made up of the images with the second-color components and third-color components and outputs the motion information, and wherein the multi-color image synthesizing section generates and outputs a picture with the first-, second- and third-color components based on not only the first synthetic image and the images with the second-color components but also the images with the third-color components.

13. The multi-color image processor of claim 1, wherein the first-color component is green.

14. The multi-color image processor of claim 1, wherein the image capturing section includes a spatial light modulator that is arranged in front of the first imager, and wherein the spatial light modulator has multiple pixels, which face the respective pixels of the first imager and which selectively transmit or cut off incoming light, thereby making the incoming light incident on selected ones of the pixels of the first imager.

15. A signal processor for outputting a picture based on multiple images with first-color components, of which one frame is comprised of n fields (where n is an integer that is equal to or greater than two), and multiple images, which have second-color components different from the first-color components and of which one frame consists of one field, the processor comprising:

a motion estimating section for outputting, based on the images with the second-color components, motion information about a moving picture made up of those images with the second-color components;

an image generating section for generating a synthetic image of the first-color components of respective fields based on the images with the first-color components and the motion information and outputting the image thus generated as a first synthetic image that has a higher spatial resolution than the images with the first-color components; and a multi-color image synthesizing section for generating and outputting a picture with the first- and second-color components based on the first synthetic image and the images with the second-color components.

16. A multi-color image processing method for outputting a picture based on multiple images with first-color components, of which one frame is comprised of n fields (where n is an integer that is equal to or greater than two), and multiple images, which have second-color components different from the first-color components and of which one frame consists of one field, the method comprising the steps of:

obtaining images with the first-color components;

obtaining images with the second-color components;

estimating, based on the images with the second-color components, a motion in a moving picture made up of those images with the second-color components and outputting motion information;

getting a motion compensation done by outputting a synthetic image of the first-color components based on the images with the first-color components and the motion information at a higher frame rate than a frame rate at which the images with the first-color components are obtained; and generating and outputting a picture with the first- and second-color components based on the synthetic image of the first-color components and the images with the second-color components.

17. A program embodied on a non-transitory machine readable storage medium and defined to operate a signal processor that outputs a picture based on multiple images with first-color components, of which one frame is comprised of n fields (where n is an integer that is equal to or greater than two), and multiple images, which have second-color components and of which one frame consists of one field, the program, when executed by the signal processor, causing the signal processor to perform the steps of:

outputting, based on the images with the second-color components, motion information about a moving picture made up of those images with the second-color components;

generating a synthetic image of the first-color components of respective fields based on the images with the first-color components and the motion information and outputting the image thus generated as a first synthetic image that has a higher spatial resolution than the images with the first-color components; and generating and outputting a picture with the first- and second-color components based on the first synthetic image and the images with the second-color components.

* * * * *

UNITED STATES PATENT AND TRADEMARK OFFICE
CERTIFICATE OF CORRECTION

PATENT NO. : 7,825,968 B2
APPLICATION NO. : 12/517391
DATED : November 2, 2010
INVENTOR(S) : Takeo Azuma et al.

Page 1 of 1

It is certified that error appears in the above-identified patent and that said Letters Patent is hereby corrected as shown below:

Title Page, Item (74), Atty., Agent or Firm: "Boissell" should read
-- Boisselle --.

Signed and Sealed this
Nineteenth Day of April, 2011

David J. Kappos
*Director of the United States Patent and Trademark Office*